United States Patent
Bennett et al.

[19]

[11] Patent Number: 6,049,666
[45] Date of Patent: Apr. 11, 2000

[54] METHOD AND APPARATUS FOR ACCURATE PROFILING OF COMPUTER PROGRAMS

[75] Inventors: James Bennett, Menlo Park; Mark Anderson, Palo Alto; Choon Piaw Na, Saratoga; Reed Hastings, La Honda, all of Calif.

[73] Assignee: Rational Software Corp., Santa Clara, Calif.

[21] Appl. No.: 09/138,111

[22] Filed: Aug. 21, 1998

Related U.S. Application Data

[63] Continuation of application No. 08/871,247, Jun. 9, 1997, which is a continuation of application No. 08/074,428, Jun. 8, 1993, abandoned.

[51] Int. Cl.$^7$ ..................................................... G06F 9/44
[52] U.S. Cl. ............................................................ 395/704
[58] Field of Search ............................................. 395/704

[56] References Cited

U.S. PATENT DOCUMENTS

| | | | |
|---|---|---|---|
| 4,845,615 | 7/1989 | Blasciak | 364/200 |
| 4,937,740 | 6/1990 | Agarwal et al. | 364/200 |
| 5,047,919 | 9/1991 | Sterling et al. | 364/200 |
| 5,142,679 | 8/1992 | Owaki et al. | 395/700 |
| 5,164,969 | 11/1992 | Alley et al. . | |
| 5,193,180 | 3/1993 | Hastings | 395/704 |
| 5,212,794 | 5/1993 | Pettis et al. | 395/700 |
| 5,247,651 | 9/1993 | Clarisse | 395/500 |
| 5,265,254 | 11/1993 | Blasciak et al. | 395/704 |
| 5,313,616 | 5/1994 | Cline et al. | 395/500 |
| 5,333,304 | 7/1994 | Christensen et al. | 395/575 |
| 5,335,344 | 8/1994 | Hastings | 395/704 |
| 5,355,484 | 10/1994 | Record et al. | 395/704 |
| 5,355,487 | 10/1994 | Kellar et al. | 395/650 |
| 5,359,533 | 10/1994 | Ricka et al. | 364/484 |
| 5,450,586 | 9/1995 | Kuzara et al. | 395/704 |
| 5,465,258 | 11/1995 | Adams | 395/704 |
| 5,539,907 | 7/1996 | Srivastava et al. | 395/705 |
| 5,732,273 | 3/1998 | Srivastava et al. | 395/704 |
| 5,740,443 | 4/1998 | Carini | 395/705 |
| 5,828,883 | 10/1998 | Hall | 395/704 |
| 5,963,740 | 10/1999 | Srivastava et al. | 395/704 |

OTHER PUBLICATIONS

Graham et al., GPROF; A Call Graph Execution Profiler, p. 120–126 (1–16) 1982.
Hilfingen, A Memory Allocation Profiler for C and Lisp Programs, p. 223–37, 1988.
Ponder et al., Inaccuracies in Program Profilers, p. 459–467, 1987.

(List continued on next page.)

*Primary Examiner*—Eric W. Stamber
*Assistant Examiner*—John Q. Chavis
*Attorney, Agent, or Firm*—Ritter, Van Pelt & Yi, LLP

[57] ABSTRACT

An object code expansion profiler equips a program for execution profiling by preprocessing the object code files of the program so as to add profiling monitoring code to the beginning of all or substantially all functions. The preprocessing includes, for each function, the steps of grouping the function's instructions into basic blocks, counting the number of cycles required to execute the instructions of the basic block, and inserting special monitoring code with the basic block. The special monitoring code is executed each time the basic block is executed, and updates the profiling information to reflect the number of cycles required to execute the basic block. Special handling is provided for profiling calls to the Operating System (OS). The resultant profiling information is converted into a call graph image most useful for human users. For each arc in the graph connecting a calling-function/parent-node to a called-function/child node, the displayed arc image has a width logarithmically proportional to the self+descendants time for the called function.

37 Claims, 19 Drawing Sheets

OTHER PUBLICATIONS

Graham et al., Executions Profilers for modular Programs.

Michael D. Smith, "Tracing with Pixie," Apr. 4, 1991, Stanford University Technical Report No. CSL–TR–91–497, pp. 1–29.

"Pixie", UNIX man pp. 1–2.

James R. Larus et al., "Re–writing Executable Files to Measure Program Behavior", Mar. 25, 1992, Univ. of Wisconsin, Computer Science Department.

Thomas Ball, "Optimally Profiling and Tracing Programs", Sep. 6, 1991, Univ. of Wisconsin, Computer Science Department.

```
┌─────────────────────────────────────────────────────────┐
│ ▽        Quantify: small.c                              │
│ File▽) Windows▽)                              Help▽)    │
│ Source file: small.c (Read Only)                        │
│ ┌─────────────────────────────────────────────────────┐▲│
│ │  *   Quantify: small.c                              │ │
│ │  *   Data from Quantify'd p1.p(pid 4539)            │ │
│ │  *   Legend:                                        │▽│
│ │  *    *-A comment line.                             │ │
│ │  *       For each basic block, the first line indicates total self│
│ │  *    I-Beginning and continuation of a single executed basic bloc│
│ │  *    #-Beginning and continuation of a basic block that was not a│
│ │  *    +-Beginning and continuation of several executed basic block│
│ │  *       Comment line follows indicating counts for each basic bloc│
│ │                                                     │ │
│ │      prime(n)                                       │ │
│ │      int n:                                         │ │
│ │  *   Called                    999 times            │ │
│ │  *   Self cycles:              1647471 ( 2.14%)     │ │
│ │  *   Self+descendants cycles:     5474995 ( 7.10%)  │ │
│ │  *   Called by:                                     │ │
│ │  *    999 times main                                │ │
│ │ 551326+  {   int 1:                                 │ │
│ │  *         3996    547330                           │ │
│ │ 3859551     for (i=2: i<n: i++)                     │ │
│ │ 7021981        if (n%i=0)                           │ │
│ │   24931           return 0:                         │ │
│ │    5041        return 1:                            │ │
│ │   49951     }                                       │ │
│ │                                                     │ │
│ │      main()                                         │ │
│ │  *   Called                    1 time               │ │
│ │  *   Self cycles:              20275 ( 0.03%)       │ │
│ │  *   Self+descendants cycles:     77067938 ( 99.90%)│ │
│ │  *   Register window spills:   1                    │ │
│ │  *   Register window time:     270 ( 1.33% of self) │ │
│ │  *   Called by:                                     │ │
│ │  *    1 time start                                  │ │
│ │ ◁ ▷                                                 │ │
│ └─────────────────────────────────────────────────────┘ │
│                                      p1.q(pid 4538)     │
└─────────────────────────────────────────────────────────┘
```

700 points to the window.

*FIG. 9*

METHOD AND APPARATUS FOR ACCURATE PROFILING OF COMPUTER PROGRAMS

CROSS REFERENCE TO RELATED APPLICATIONS

This application is a continuation of Ser. No. 08/871,247, filed Jun. 9, 1997; which is a continuation of Ser. No. 08/074,428, now abandoned, filed Jun. 8, 1993. This application is related to U.S. Ser. No. 07/970,315, filed on Nov. 2, 1992 now U.S. Pat. No. 5,335,344, which is a continuation of U.S. Ser. No. 07/718,573, filed on Jun. 21, 1991, now U.S. Pat. No. 5,193,180.

BACKGROUND OF THE INVENTION

The present invention relates generally to a method and apparatus for profiling computer programs. In particular, one aspect of the present invention relates to a method for inserting additional instructions and data into existing relocatable object files of a computer program to collect very detailed and accurate profiling information. Another aspect of the present invention relates to a method for converting profiling information into image data for communication to a user/developer.

Profiling is a technique commonly used by software developers to gain information about the operation of their code. This information can then be used to improve and optimize the code. Profiling is done by processing the program under development with a profiler. The profiler adds code to the executable file so that it records various types of statistical data as the program runs. The type of data recorded varies with the profiler used.

One traditional and widely used profiler under UNIX is known as prof. Object code files are supplied to prof, which links the object files and adds monitoring routines to be executed at the beginning and end of the program. The initial routines set up a program sampler triggered by timing interrupts. The program sampler, which is invoked with a period of 1/100 of a second, records the value of the program counter register. The routines added to the end of the program take the saved data and create an output file showing the time apparently spent in the various routines; this output can be organized as a histogram.

This information can be useful to a programmer by indicating which routines consume the most execution time and are therefore the best places to focus on improvement. prof suffers from a number of limitations: it requires Operating System ("OS") support for its interrupts; it shows where the execution is at the sampling times, but does not show "why" (does not identify the call chain that led to current function being called); and it relies on timed interrupts with a 1/100 second sampling period. The sampling period causes sampling errors because with today's fast processing speeds a great many instructions can be executed in 1/100 of a second; many routines have total execution times shorter than this. The execution of short routines can go entirely unnoticed by prof, and sampling errors can cause significant inaccuracies in the measured execution times even for longer routines. The 1/100 sampling period could be theoretically shortened, but this has been found to add excessive overhead, so prof implementations generally do not allow "tuning" of the sampling rate. Furthermore, because the timing interrupts that trigger the sampling mechanism are not generated during OS function calls, OS function calls appear "free" under prof, whereas in actuality they (and therefore the program functions calling them) might be responsible for a primary portion of the total execution time.

Another commonly used profiler, known as gprof, relies on recompilation of source code to add more monitoring features than are present in prof. In addition to the interrupt sampling performed by prof, gprof adds code to the beginning of each function to record which function called it. A significant problem arises, however, if the program employs library code for which source files are unavailable. gprof is then unable to process the functions defined in these files, and their callers cannot then be recorded. When the execution sequence passes into one of these unmonitored functions, the call trace is severed. If the unmonitored function initiates calls that lead back into a monitored function, this calling of the monitored function will be disconnected from the remainder of the call trace (such situations are termed "spontaneous function calls").

A simple program, in which start calls main, main calls function A, function A calls functions B and C, and function B calls function D, might result in gprof output statistics similar to those shown in Table I. The time column shows in seconds first the self time for the function, then the self+descendants time, which is the sum of the self time for the function of concern plus the self times of all the descendants of the function of concern. Typical gprof output tables would typically also include indications of how many times each function was called by each of its caller functions.

TABLE I

| routine | callers | time |
| --- | --- | --- |
| start | | 0.1/101.1 |
| main | (start) | 1.0/101.0 |
| A | (main) | 10.0/100.0 |
| B | (A) | 20.0/60.0 |
| C | (A) | 30.0/30.0 |
| D | (B) | 40.0/40.0 |

Typically, a programmer might then manually convert this table into a graph, such as shown in FIG. 1A, but this process is very complicated and painstaking for larger programs. To improve the ease of use of gprof output, some postprocessors are now available that can process the source code for a program to produce a static call graph and then overlay the gprof statistics on top of the static call graph. (In prior art systems the gprof statistics have been shown either by histograms next to each graph node, or by color coding of graph nodes.) The need for source code, however, is a serious drawback to such postprocessing, and significantly limits its usefulness.

Further limitations to the usefulness of gprof include those stemming from the use of timing interrupts as discussed above with reference to prof (sampling errors and inability to track OS calls), and poor handling of multiply called functions. For instance, suppose that in the above example, function D was called by both functions B and C, in which case the call graph would be as illustrated in FIG. 1B. The self time for function D would then have to be split up for allocation between the self+descendants times for functions B and C.

To make this allocation gprof relies upon an assumption of an average case distribution. That is, gprof assumes that all calls to a particular function require the same amount of time for completion. The self time for function D would then be allocated to the self+descendants times for functions B and C proportionally to the number of times that each of them called function D. However, because the arguments passed to a function can drastically effect the amount of time required to complete the function call, the average case distribution assumption employed by gprof can result in significant inaccuracies in reported times.

For example, if functions B and C both called function D 40 times, and the calls originated by function B consumed three fourths of function D's time (with the calls originated by function C consuming the remaining one fourth), the correct profiling statistics would be as shown in Table II. Because of its average case distribution assumption, however, gprof would allocate function D's time equally between functions B and C, and would prepare inaccurate profiling statistics as shown in Table III.

TABLE II

| routine | callers | time |
|---------|---------|------|
| start   |         | 0.1/101.1 |
| main    | (start) | 1.0/101.0 |
| A       | (main)  | 10.0/100.0 |
| B       | (A)     | 20.0/50.0 |
| C       | (A)     | 30.0/40.0 |
| D       | (B)     | 40.0/40.0 |

TABLE III

| routine | callers | time |
|---------|---------|------|
| start   |         | 0.1/101.1 |
| main    | (start) | 1.0/101.0 |
| A       | (main)  | 10.0/100.0 |
| B       | (A)     | 20.0/40.0 |
| C       | (A)     | 30.0/50.0 |
| D       | (B)     | 40.0/40.0 |

Like prof, gprof concentrates on zero order profiling statistics. That is, timing statistics for a particular function are recorded with that function as the only reference point. gprof does not record any first order or other higher order timing distribution statistics, that is, timing statistics regarding a particular first function having been called by a particular second function. The only rudimentary first order statistics of any kind recorded by gprof are the number of times a called function was called by each of its caller functions. Because gprof cannot record first order timing statistics, however, gprof is forced to use the average case distribution assumption to calculate self+descendants time in many situations, as described above.

An improved profiler that remedies the deficiencies of prior art profiling techniques is clearly desirable.

SUMMARY OF THE INVENTION

According to the present invention an improved method and apparatus are provided for performing execution profiling. A first aspect of the invention is directed to a method for equipping a program for execution profiling that comprises the step of preprocessing the object code files of the program so as to add profiling monitoring code to the beginning of all or substantially all functions, without needing source code, so that profiling information is available for the entire execution of the program.

According to one facet of this first aspect of the invention, timing information is collected by forming tallies of the number of cycles required to execute the profiled instructions. The preprocessing includes, for each function, the steps of grouping the function's instructions into basic blocks, counting the number of cycles required to execute the instructions of the basic block, and inserting special monitoring code with the basic block. (Later, when the target program is run, the special monitoring code is executed each time the basic block is executed, and updates the profiling information to reflect the number of cycles required to execute the basic block. In some embodiments the initial profiling code for a function also records at least a partial call chain, indicating where the function was called from, to enable compiling second order or higher order timing statistics.)

According to another facet of this first aspect of the invention, special handling is provided for profiling calls to the Operating System (OS). OS calls can be categorized into three groups: (1) calls that may require an indeterminate amount of time ("indeterminate length"); (2) calls that substantially always require a certain, fixed amount of time ("fixed determinate length"); and (3) calls that substantially always require an amount of time determined by identifiable program status constraints, but which therefore vary according to program status ("variably determinate length"). The preprocessing step includes inserting code before and after at least indeterminate length OS calls to start a timing procedure before the OS call, end the timing procedure after the OS call, determine the elapsed time and then incorporate this into the profiling information. In some embodiments, the time required for fixed determinate length OS calls is determined during preprocessing and then tracked during execution in the same manner as for basic blocks, described above. In preferred embodiments, the preprocessing step includes adding simulation code to profile variably determinate length OS calls. The simulation code models or tracks the program status constraints that determine how long the OS call will require. For each variably determinate length OS call, code is added that evaluates the simulated program status constraints, determines from this the time required for the OS call, and updates the profiling information accordingly.

According to yet another facet of this first aspect of the invention, the preprocessing step includes adding terminal profiling code at the end of each function of the program. The terminal profiling code for a called function passes profiling information, including the self-plus-descendants time for the called function, back to the caller, so the profiling code for the caller function can accurately maintain self-plus-descendants time without the need for inaccurate distribution assumptions such as the average case distribution assumed by the prior art.

A second basic aspect of the present invention is directed to a method of converting profiling timing information into useful image data for human users. A first facet of this aspect of the invention is directed to using the detailed profiling information gathered as discussed above to automatically create a dynamic call graph, rather than having to process source code and simply producing a static call graph.

A second facet of this aspect of the invention results from discovery of the fact that human users have a superior intuitive understanding of much of the basic timing statistics, especially the self+descendants time, as a "river of time," in which the total amount of time used by the program is allocated to, or "passes through" the main function, after which it splits into main "tributaries" for the primary routines called from the main function, with these main tributaries splitting into smaller tributaries for the secondary routines called by the primary routines, etc. According to this facet of the invention, therefore, visual presentations of profiling data are constructed so as to correspond to the human user's "river of time" intuitive understanding of the data. A method of converting profiling information into a call graph according to this facet of the invention comprises, for each arc in the graph connecting a calling-function/parent-node to a called-function/child node, the steps of converting the self+descendants time for the called function into a width measure, and displaying the call graph with each arc having a display width corresponding to the width measure determined for that arc. In a preferred embodiment, the display width of an arc is computed to be logarithmically proportional to the self+descendants time for the called function.

A further understanding of the nature and advantages of the invention may be realized by reference to the remaining portions of the specification and the drawings.

BRIEF DESCRIPTION OF THE DRAWINGS

FIG. 9 shows a coverage display window of a particular embodiment of the present invention.

DETAILED DESCRIPTION OF PREFERRED EMBODIMENTS

The preferred embodiment of the present invention employs numerous novel techniques for providing enhanced profiling capabilities to a user. These techniques improve all three major prongs of the profiling process: preprocessing an application to add profiling code, executing the augmented application to collect profiling information, and then presenting the collected information to the user.

I. Augmenting the Application and Collecting Profiling Data

One aspect of the present invention is directed to a method for equipping a program for execution profiling by preprocessing the object code files of the program so as to add profiling monitoring code to all or substantially all functions of the program. The detailed analysis and preprocessing made possible by object code insertion improves both the profiling coverage of the program and the profiling accuracy. Object code insertion also enables the use of a technique according to another aspect of the invention, which is the maintenance of profiling timing information according to the number of CPU cycles required to perform the instructions of the application routines. The execution cycles for most instructions are determined during preprocessing; for other instructions, profiling code is added to dynamically determine their timing during execution.

A. Profiling by Object Code Insertion

In the preferred embodiment, the insertion of additional code is performed in the manner taught by U.S. Pat. No. 5,193,180, which is herein incorporated by reference in its entirety, for all purposes, and with special reference to its teachings regarding the implementation of monitoring schemes. The particular embodiment described herebelow is intended for a SUN SPARC station, so the description is particular in some respects to that system.

Figure 2:
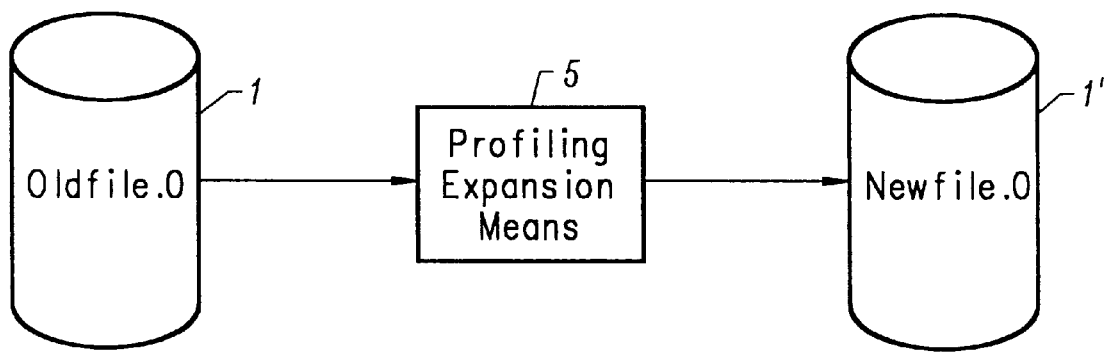
FIG. 2 is a block diagram showing a relocatable object file being expanded by a profiling expansion means according to an aspect of the invention into a new relocatable object file.

FIG. 2 illustrates a preexisting object code file 1 ("oldfile.o") being augmented by profiling expansion means 5 to form a new object code file 1' ("newfile.o"). In the preferred embodiment, profiling expansion means 5 is a general purpose computer having a memory and operating under the control of a computer program. In the this embodiment, all object files of the target application program are processed by a profiling program that uses the above expansion means to insert profiling monitoring code to each function of the program. All of the object code files for an executable program are processed, and instructions are added to implement the profiling scheme described below when the application program is executed. Because source code is not needed, all of the files and functions of the program can be monitored. This provides complete profiling coverage of the program, rather than only partial coverage where source code was unavailable (as with the prior art).

Figure 3:
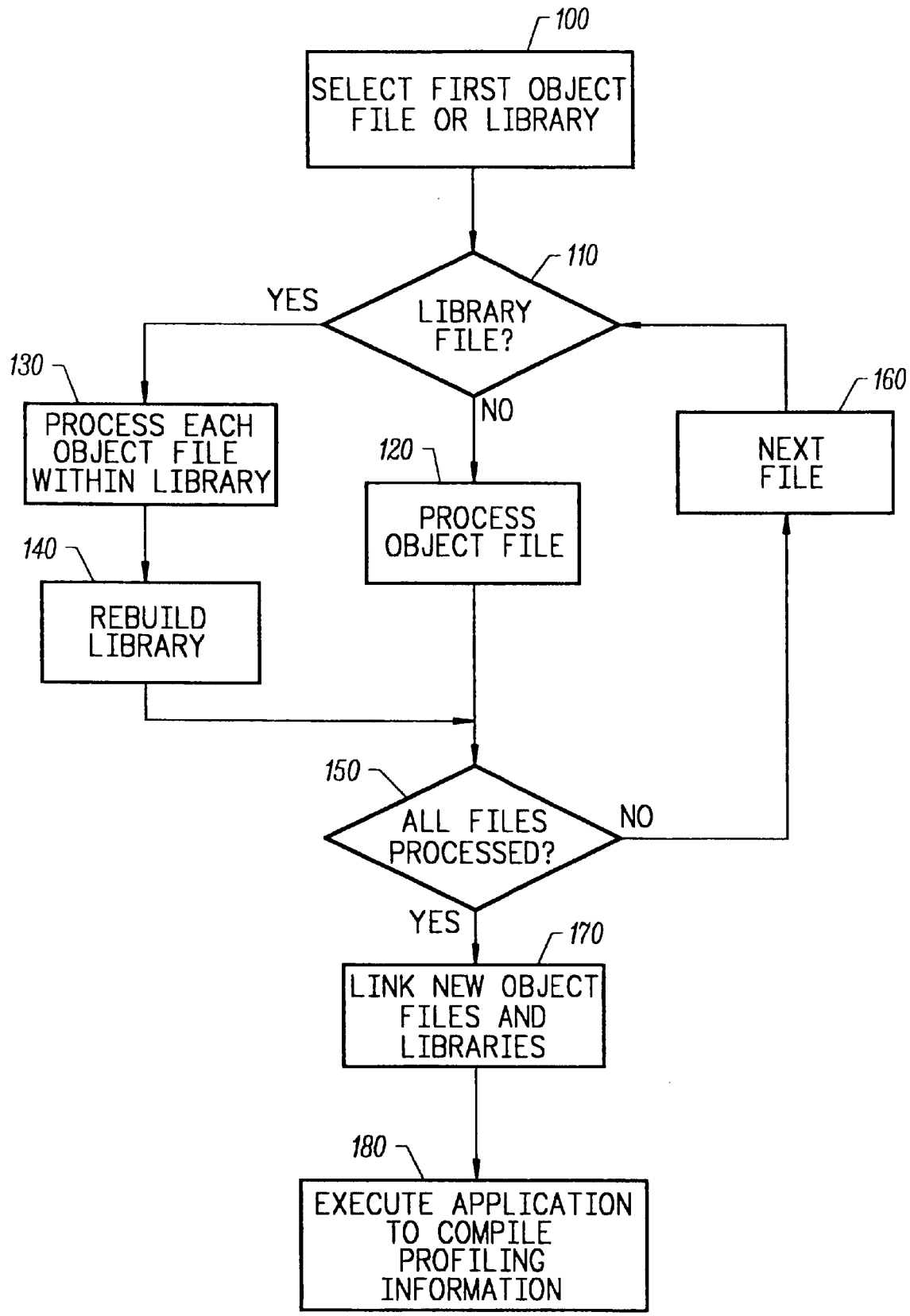
FIG. 3 is a flowchart illustrating a general procedure for implementing the profiling scheme of the present invention by modifying the object files for an executable program.

The general procedure of implementing a profiling scheme to have full coverage for an executable program, by modifying all of the object code files for the executable program, linking the modified program and then running it, is illustrated in FIG. 3. A first object file or library for the executable program is selected in block 100. If the file is determined to be a simple object file rather than a library, in block 110, then the object file is processed in block 120 to implement the profiling, by the expansion process described in the above referenced U.S. Pat. No. 5,193,180. If the file is determined to be a library in block 110, then each object file that contributes to the library is processed in block 130, in the same manner that a simple object file is processed by block 120. Then, in block 140, the library is rebuilt from the modified object files.

After the object file or library has been processed, block 150 determines if any unprocessed files remain for the executable file. If so, block 160 selects an unprocessed file and then the steps of blocks 110–150 are repeated. Once it is determined in block 150 that all files for the original executable program have been processed, all necessary linkage is performed in block 170. In the preferred embodiment this linkage includes linkage to a special library of profiling routines. These profiling routines include a program start routine and a program exit routine that are linked to execute at the start and finish, respectively, of the program. Also included in the profiling library are function entry and exit profiling routines, and various other timing routines described below. After linkage, the program is executed in block 180; during this execution, the desired profiling is performed.

B. Preprocessing for Cycle-Counting Profiling

In the preferred embodiment, profiling expansion means 5 is provided with detailed information regarding the computer system on which the profiled program is to be run. This information includes the type of CPU employed by the computer system, the clock speed or clock cycle period of the CPU, the cache architecture, the presence of coprocessors, and any other information necessary to determine the number of clock cycles required to execute the instructions in the instruction set for that CPU.

Figure 4:
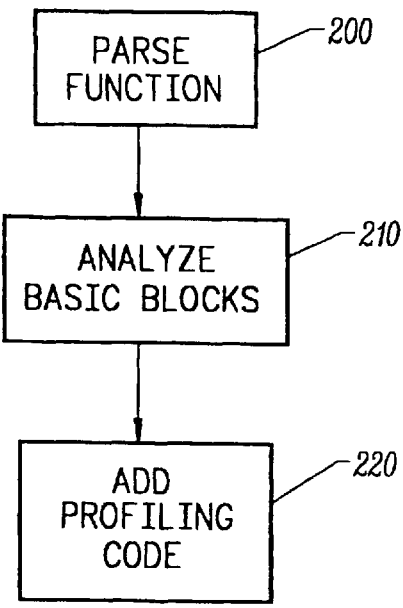
FIG. 4 is a flowchart illustrating the general process of adding to a function the profiling code of the preferred embodiment.

Profiling initialization and profiling termination routines are added so as to be executed at the beginning and end, respectively, of the program. Also, every function in every object file for the application program is processed to have added to it the profiling code of the present invention. The general process of adding to a function the profiling code of the preferred embodiment is illustrated by the flowchart of FIG. 4. Step 230 of FIG. 4, the step of adding basic block profiling code, is illustrated in further detail in FIG. 5. The operation of the profiling code is explained primarily with reference to FIG. 6.

In the process of FIG. 4, first, at step 200, the instructions of the function are parsed into basic blocks. A basic block is a contiguous sequence of instructions that has no branches into or out of its body except as follows: a basic block begins with an instruction that is a program control transfer destination—either the destination of a branch (including the default or fall-through destination of a conditional branch) or the destination of a call instruction, and ends with a program control transfer instruction—either a branch or exit instruction. If the computer architecture entails delay slots following branches, such delay slots are considered part of the basic block of the branch statement they follow. The smallest possible basic block is two instructions: the destination of a branch/call instruction and that is itself a branch/exit instruction, followed by its delay slot. In some embodiments a call instruction, which is akin to a branch followed by a return, is treated as a basic block terminator, although in the preferred embodiment call statements do not terminate basic blocks.

The usefulness of parsing the code into basic blocks is that each basic block is always executed as a unit: if the first instruction is executed then the entire block is executed; if the first instruction is not, then the remainder of the block is not. After parsing the function code into basic blocks, each of the basic blocks is analyzed at step 210, as described further below. Next, at step 220, function entry profiling code, basic block profiling code, and function exit profiling code are added to the function as determined according to the above analysis. In the preferred embodiment the function entry and exit profiling codes take the form of calls to special routines in a profiler library, which are added to the beginning of the function and to any basic blocks ending in a function exit instruction, respectively. It should be noted that the parsing, analysis, and code insertion steps can be intermixed.

Figure 5:
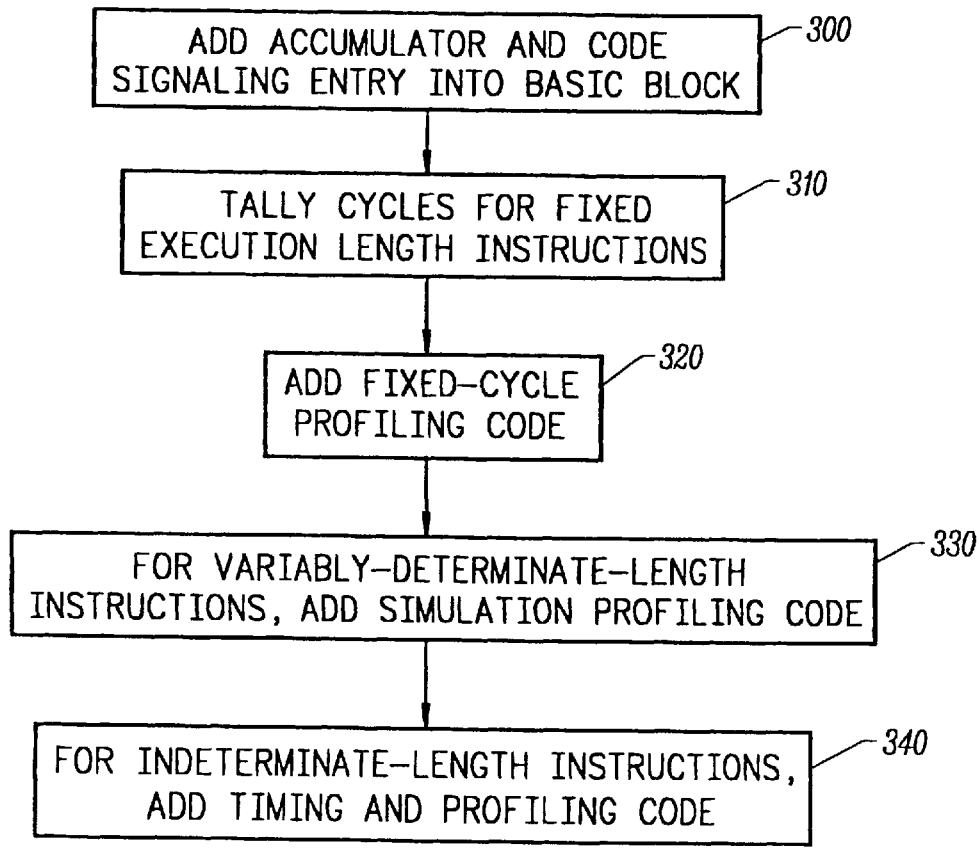
FIG. 5 illustrates a flowchart showing details of the process of adding time profiling code to each basic block, according to a preferred embodiment of the present invention.

The process of profiling code to each basic block is illustrated in further detail in FIG. 5. At step 300, basic block entry code is added to the start of the basic block. (Later, during execution of the application program, this basic block entry code will signal another entry into the basic block, by incrementing an executions accumulator, which tallies how many times the basic block was executed). In the preferred embodiment step 300 is only performed if source code is available for the function and if the source code has been compiled for debugging, because this particular profiling information is only used in the show-coverage display of source code, described below. The profiling code determines whether source code is available by looking for debugging symbols provided by the compiler.

Next, at step 310, for all of the instructions requiring a fixed number of clock cycles to execute, these cycles are tallied, including the delay slot for the terminating branch. This step includes an architecture-specific analysis of the instructions to determine the required number of cycles for execution. In the preferred embodiment, this analysis includes identifying stalls, such as caused by loads and moves, and accounting for the amount of time required, including the stall. (On many systems, the instruction following a load or move will be executed when the load has been initiated, without waiting for it to be completed. An exception occurs when the instruction following the load requires the use of the destination address or register of the load instruction, in which case a stall occurs until the load has been completed.)

After the fixed instruction cycles for the basic block have been tallied, fixed cycle profiling code is added to the basic block at step 320. (Later, during execution of the application program, each time the basic block is executed the fixed cycle profiling code will increment the self time accumulator for the current function by the determined number of cycles.) In the preferred embodiment, fixed length Operating System (OS) calls, discussed further below, are treated in steps 310 and 320 just like other fixed execution length instructions and charged to the self time of the current function. In alternative embodiments, however, they are tracked as independent functions and their execution time is not tallied in step 310. Instead, step 320 includes adding code to update self time accumulators for the OS call and to charge the execution time for the OS call to the self+descendants accumulator for the present function. Similarly, in the preferred embodiment other OS calls, discussed below, are charged against the self time of the current function, but could instead be tracked as independent functions.

After step 320, at step 330 any desired simulation profiling code is added to the basic block. This is generally added only to basic blocks containing any variably determinate length instructions, but the completeness of the simulation may require that simulation code be added even to some basic blocks that do not contain any variably determinate length instructions. Finally, at step 340, if the basic block includes an indeterminate length instruction, the indeterminate length instruction is wrapped in timing profiling code. Variably determinate length instructions and indeterminate length instructions are described in further detail below, in the discussion regarding OS calls.

By performing execution timing according to information obtained during preprocessing, profilers according to the present invention essentially create virtual cycle counters. That is, they generally do not count the actual number of cycles taken by the program during the profiling run, but rather, most cycles are counted according to what the preprocessing determines the unaltered program would take in the absence of additional profiling code.

C. Execution of Cycle-Counting Profiling Code

FIGS. 6A–6E illustrate the operation of various types of profiling code during execution of the target application at step 180 of FIG. 3. The two main data structures relied on by the profiling code are individual function accumulators, and a simulated parallel call stack.

In some embodiments, the function accumulators are statically linked into the application code, substantially adding to the symbol table. In the preferred embodiment, however, function accumulators are located dynamically, as discussed below. Each function accumulator has a set of primary profiling registers for the overall function, and an array of registers for maintaining information on the usage distribution for basic blocks (including the number of times "hit" and the total number of cycles consumed). The primary registers of the function accumulator track 1) the number of calls to the function; 2) the minimum and maximum self times for the function, over all calls; 3) the sum of the self times for the function, over all calls; 4) the sum of the self+descendants times for the function, over all calls; and 5) the head of a linked list of caller records for all callers of the function. The min and max self times are particularly helpful when profiling functions that undergo substantial initialization the first time they are called. The primary registers optionally also track the number of register window spills (see below) and the aggregate amount of time spent in them, and the number of and aggregate time for OS calls.

Each of the caller records contains an identification of the caller, a cumulative counter for the number of times the current function has been called by the particular caller function, and a cumulative counter for the total number of self+descendants cycles from the current function that are attributable to the particular caller function. Note that the caller identification can simply be a pointer to the caller's accumulator. In some embodiments the caller records also track min and max self times for the current function when called by that particular caller function. These caller records serve to track profiling data by a call chain one call deep (the caller function); more extensive caller records can be maintained and indexed by longer call chains so as to provide higher order timing statistics.

The parallel stack serves both as a source for local counters that are used to store the timing statistics for the each extant instantiation of each function, and also as a call chain structure to allow for the proper attribution of self+ descendants time. Each frame on the parallel stack identifies the corresponding function, contains or points to the local variables tracking the that particular function call, and, so as to properly profile "tail call" optimized code, identifies the exit point for the function. This latter tracking can often cause the simulated parallel stack to differ substantially from the actual stack.

Tail call optimization is a technique allowable when function A calls function B, and function B as its last instruction calls function C and returns this value to function A. Under a standard compiler, the call to function C would result in another frame being pushed on the stack, and the return from function C would be followed by an immediate return with the same value from function B to function A. In order to minimize the depth of the stack, in call chain optimization the call to function C would result in function B essentially giving its position on the stack over to function C, so that at the return from function C, the immediately preceding function on the stack, to which function C would return, would be function A (bypassing function B). If the parallel stack were also maintained in this manner the correct profiling information could not be attributed to function B. So, according to an aspect of the present invention, the frame for function B would remain on the parallel stack, but the frame for function C would point to function A as its exit point.

In some embodiments, frames on the parallel call stack simply identify each calling function by name, or by some other identifier for the function as a whole. In other embodiments, however, frames on the parallel stack frame also identify call site. In these embodiments, if function A has two distinct call instructions to function B, each of these calls would be distinguished on the parallel stack frame, and would be distinguished in the tracked profiling data as well. For example, the execution times for function B would get rolled up to function A in the usual manner, but presentations of the allocation of function B's times to its various callers would have one allocation to the first call site in function A and a separate allocation to the second call site in function A.

When presenting information about a call site for which a linker symbol is unavailable, such as in the above case with the two call sites within function A, the call site will be labeled as an offset from the closest previous location for which a symbol is available. For example, the first of the above mentioned call sites in function A might be identified as "A+20", and the second call site might be identified as "A+65".

1) The Function Entry Profiling Routine

Figure 6A:
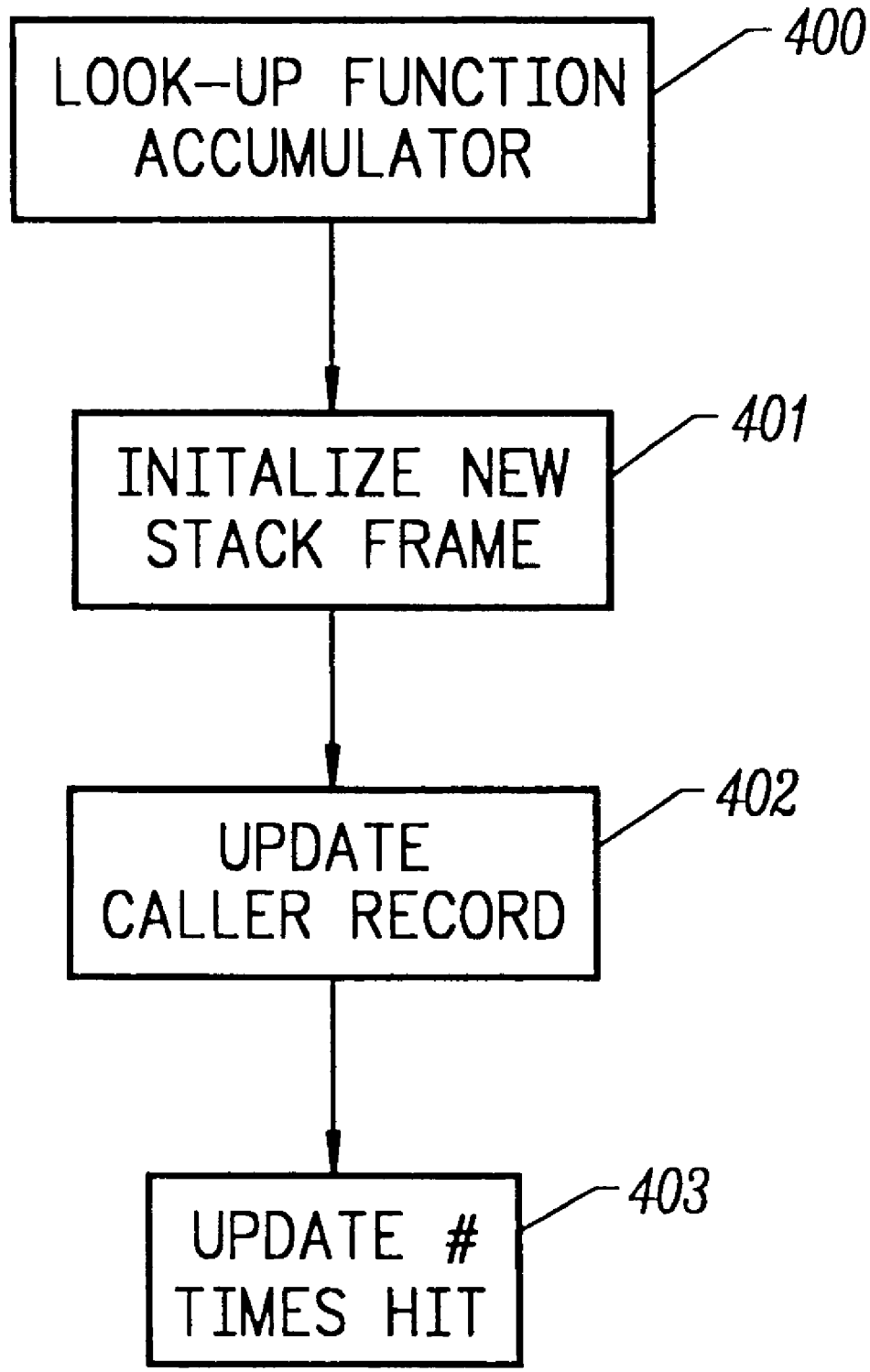
FIGS. 6A–6E illustrate the operation of various types of profiling code during execution of the target application.

FIG. 6A illustrates the operation of the function entry profiling routine. First, at step 400 the location of the function accumulator is looked up in a global table. The first time the function is run, the accumulator location table entry is initialized by executing a set of instructions created during the preprocessing step. These instructions are sethi V1, %g3 jmpl [%g4+FNOFFSET], %g2 or V2, %g3

During the preprocessing step the position of the accumulator relative to the function offset was fixed and the values V1 and V2 were determined so that the first and third instructions would cause g3 to contain the location of the accumulator relative to the jumpl statement. The second statement produces an object code having a constant value, and is thus used as a flag that can be searched for either to discover the accumulator locating instructions, or to determine the existence of the function. This latter aspect can be used for counting and reporting the total number of functions in the program, whether executed or not, and whether or not they are assigned symbols in the symbol table.

The second step of the function entry code is to initialize a new frame on the parallel stack at step 401, and initialize the local counters, which include self time and self+ descendants time. Next, at step 402, the caller record is updated. This step includes the substeps of first determining the caller from the parallel call stack, and then examining the caller linked list from the current function accumulator to see if there is already an entry. If not, the an entry is created. Then, the number of times hit counter for the caller record is updated. Next, at step 402, the return point for the current function is recorded. Finally, at step 403, the global number of times hit counter for the current function is updated.

2) The Function Exit Profiling Routine

Figure 6B:
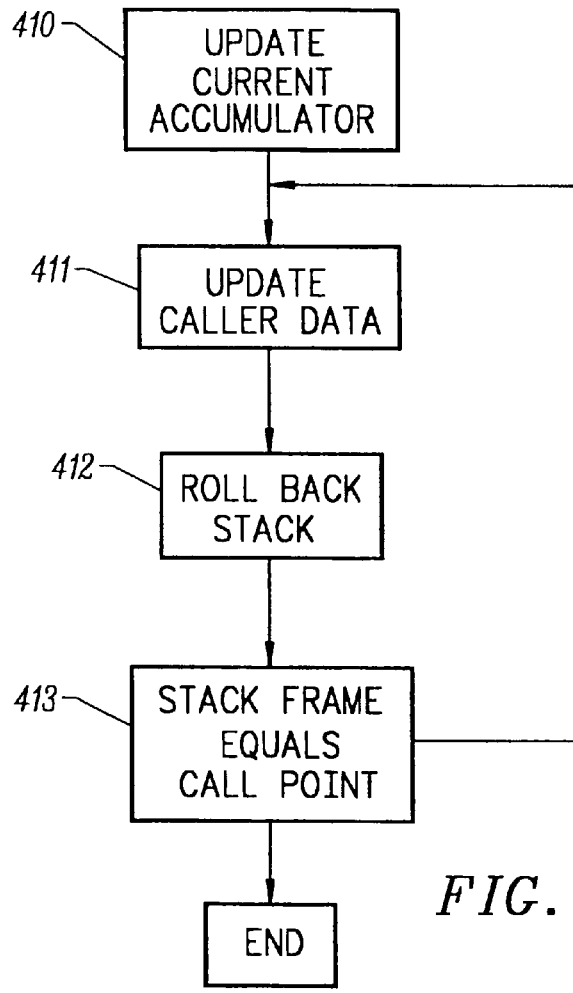

The operation of the function exit profiling code is illustrated in FIG. 6B. When executed, this routine first updates the current function accumulator according to the local counts, as indicated by step 410. Next, at step 411, the caller record and function accumulator for the call function indicated at the end of the stack are updated according to the current local counts. This updating includes updating self+ descendants time for the caller function. Following step 411, the parallel stack is rolled back to the next stack frame at step 412, and at step 413 the new stack end frame is compared to the recorded exit point. If not equal, steps 411–413 are repeated. The self+descendants times are thus "rolled up" from the lower level functions to the higher. So, the profiling code for the caller function can accurately maintain self-plus-descendants time without the need for inaccurate distribution assumptions such as the average case distribution assumed by the prior art.

3) Basic Block Timing

Figure 6C:
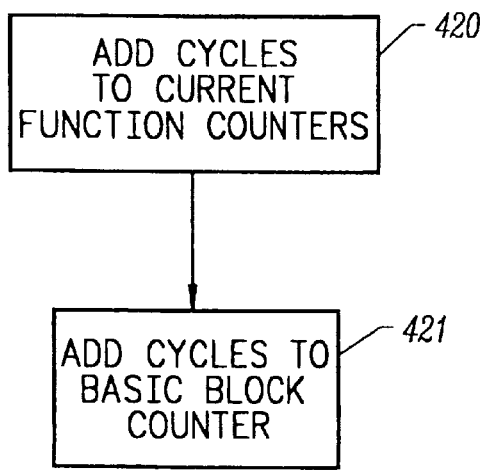

FIG. 6C illustrates the steps performed by the fixed-cycle profiling code. These steps are step 420 of adding the number of fixed cycles for the basic block (previously determined during preprocessing) to the self time and to the self+descendants time for the current function, and step 421 of adding the number of fixed cycles for the basic block to the basic block array counter.

4) Timing of OS Calls

Figure 6D:
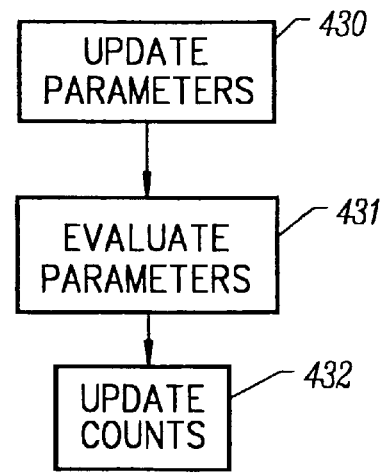
Figure 6E:
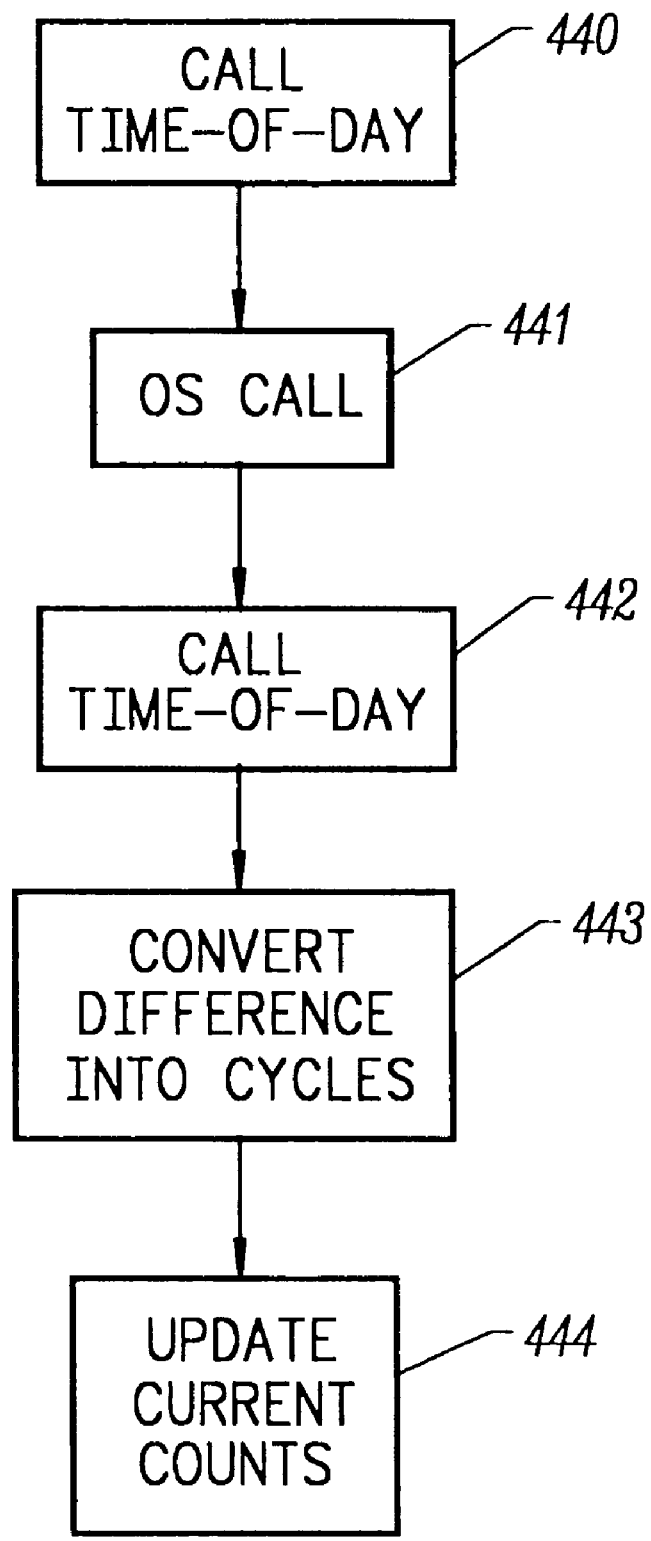

The operations of profiling code for variably determinate length instructions and indeterminate length instructions are illustrated in FIGS. 6D and 6E, respectively. These types of profiling techniques are most frequently used for profiling OS calls (sometimes known as traps). OS calls can be categorized into three groups: (1) calls that substantially always require a certain, fixed amount of time ("fixed determinate length"); (2) calls that substantially always require an amount of time determined by identifiable program status constraints, but which vary according to program status ("variably determinate length"); and (3) calls that may require an indeterminate amount of time ("indeterminate length").

Many OS calls, typically the fastest ones, require a fixed number of cycles to execute, and are therefore considered to have a fixed determinate length. For these OS calls, timing is performed in the same manner as for regular instructions: the required number of cycles is simply added to the basic block's fixed self time during preprocessing.

Other OS calls substantially always require an amount of time that can be determined by identifiable program status constraints, and are therefore said to have variably determinate length. One commonly used type of variably determinate length OS call relates to the use of register windows. SPARC computers generally employ register windows to increase efficiency of function calls. A register window is a bank of hardware registers provided for a function's use as it is called. A register window typically includes registers for the function's input arguments, registers for local use within the function, and registers for output arguments; this lessens the need for memory accesses and therefore speeds up the execution of the function. The computer will have a predetermined number of register windows available, logically organized as a ring buffer to provide unlimited depth, with an identified first used register window and a pointer to the last used (or current) register window. When a function call is performed, an OS register save call is generally performed to increment the current-window pointer; when a function return is performed, an OS register restore call is performed to decrement the current-window pointer.

Window "spills" occur if a register save is performed when the buffer is full (window overflow), or if a register restore is performed when the buffer is empty (window underflow). Window overflows and underflows result in the contents of a register window being saved to memory or restored from memory, respectively. Normal window saves and restores simply require an increment or decrement of the current-window pointer/register and are executed quite quickly (typically one clock cycle), while a window spill consumes a large amount of time due to the required memory accesses (270 cycles, for example).

In order to accurately track the amount of time consumed by a variably determinate length OS call, code is inserted to simulate the parameters that determine how long such a call will require. In general, the timing code for a variably determinate length OS call performs the steps illustrated in FIG. 6D. First, at step 430, any necessary maintenance for the simulation of the necessary parameters is performed. The simulation code models or tracks the program status constraints that determine how long the OS call will require. This modeling is generally architecture specific. Next, at step 431, the relevant parameters are evaluated to determine the time required by the OS call, after which at step 432 the current self time count is updated accordingly. For the register window example, the necessary parameters are the number of register windows allowable under the particular computer architecture ("WIN"), and the number of register windows currently in use in the window buffer ("CWP"). The profiling code for a register save/restore call therefore increments/decrements CWP, determines whether a window spill is caused according to whether (CWP mod WIN) is zero, and increments the basic block time count by either one cycle or 270 cycles, according to this determination.

In some situations, it might be desirable to treat variably determinate length calls as if they were fixed determinate length calls. For example, if a particular call nearly always required three cycles to execute, but on rare occasions required four cycles to execute, considerations of profiling accuracy versus the added overhead costs of simulating the required constraints might dictate that perfect accuracy be sacrificed.

There are a many OS calls whose execution time cannot be predetermined by the computer program and which therefore have indeterminate length; this can be for various reasons. The execution tine of some OS calls depends upon information that it is impracticable for the program to access. Additionally, in a multitask environment, OS calls give the OS a chance to switch the current process out for another. This cannot be predicted by the program and can make an OS call very timewise expensive to the program, but could not be tracked in the prior art. OS calls having a very short execution time are immune to or at very low risk of such swapping and can thus be treated as having a fixed execution time, as discussed above. Longer, variable length OS calls, however, are at much higher risk of causing the program to be swapped out. It is often possible to eliminate or reduce the number of such calls, so it is considered beneficial to charge their time to the initiating program function. Other calls, such as requests for user input, depend on factors external to the computer system itself. They can have variable length, but because they are often unavoidable and because the time required for them is generally many orders of magnitude larger than for any other code, in the preferred embodiment OS calls for user input are not timed; the time consumed by them is not charged to the program by the profiler.

According to one aspect of the present invention, OS calls of indeterminate length are timed by wrapping them in timing code. In the preferred embodiment this is performed by calls to a time of day function before and after the OS call. As illustrated in FIG. 6E, at step 440 the time of day function is called to determine the start time. At step 441 the OS call itself is then initiated. Next, at step 442 the time of day function is called again to determine the stop time. Following this, at step 443 the timing code computes the elapsed time (as the difference of start and stop times) and multiplies it by the clock frequency to determine the number of cycles used, which are added to the current time count at step 444. This technique can be used for variably determinate length OS calls as well, but the time of day calls generally require more overhead than is necessary to simulate the necessary parameters.

Once the application program has completed its normal execution, the profiling termination routine is called to locate accumulators and launch a display program.

II. Display of Profiling Data

The step of converting the high volumes of profiling data into representations that are useful to human users is as critical as the step of compiling highly accurate profiling data. A second basic aspect of the present invention is directed to a method of converting profiling timing information into useful image data for human users.

A. Generation of Dynamic Call Graph

According to this aspect of the invention, the preferred embodiment provides graphing code that uses the detailed profiling information gathered in the caller records, as discussed above, to automatically create a dynamic call graph, rather than having to process source code and simply producing a static call graph that lacks coverage of functions for which source code is unavailable.

Figure 7:
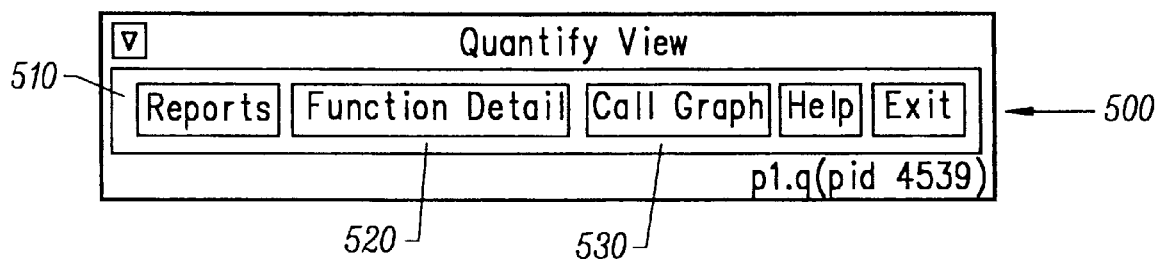
FIG. 7 shows a view selection window of a particular embodiment of the present invention that allows a user to select various view windows for displaying data.

Once the graphing code has constructed the dynamic call graph, various views can be displayed. FIG. 7 shows a view selection window 500 that allows a user to select various other view windows for displaying data. This window and others are presented on the computer display and allow selections to be made with a cursor under the control of a computer mouse and computer keyboard keys, as is well known in the art. The view selection window provides a reports select button 510, a function detail select button 520, and a call graph select button 530. In response to activating the reports select key 510, a reports window is displayed.

Figure 8:
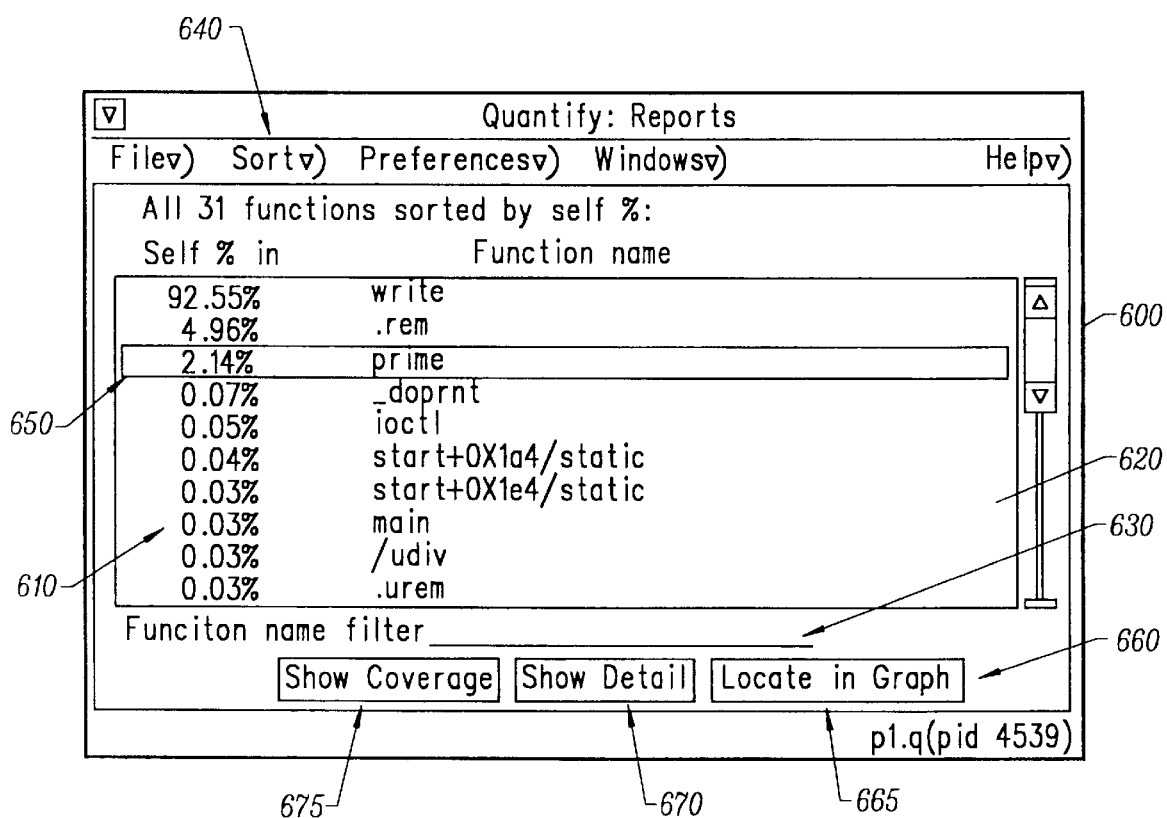
FIG. 8 shows a reports display window of a particular embodiment of the present invention.

As shown in FIG. 8, reports window 600 is initialized with a list 610 of all the functions of the program listed and sorted by self time as a percentage of the total time consumed by the program (as shown under the heading "self % in"). If function list 610 includes more functions than can be displayed in function text box 620, the list can be scrolled through in a standard manner. A function name filter, indicated by reference numeral 630, is provided to allow the user to restrict the display to only certain functions of special interest by entering a function name or text expression. Sort button 640 can be used to change the criteria by which the functions are sorted; any one of the data items gathered may be used to sort by. If the mouse is used to click on a line, then that function is selected, as indicated by reference numeral 650. Double clicking on a line will cause the function to be selected in all the windows, not just the current window. If a function is selected, then any of several actions 660 can be selected for it.

Locate in graph button 665 brings the call graph window to forefront of the display, just as when select call graph button 530 is activated (as described in detail below), and also finds the selected function and centers it within the call graph window. Show detail button 670 operates the same as the select function detail button 520, and is described further below. Show code coverage button 675, which can only be selected if source code is available for the function, generates an annotated source code file 700 as shown displayed in FIG. 9.

The source code is annotated in several ways. A number of comment lines are added, marked with an "*", summarizing overall function details such as the number of times called, the function names of callers, etc. Each program source line may contain a number in the margin indicating the number of instruction cycles executed by that line (or basic block) over all calls to the function. If the line contains calls to descendant functions, the descendant counts are not shown, only self time is shown. In the preferred embodiment, these times are displayed as percentages of the total self time for the function. Lines marked with a vertical bar ("|") indicate the start and continuation of a single basic block or line that was executed during the run. For basic blocks, the first line reports the data on instruction cycles executed for the block, and subsequent bars without timing data indicate the extent of the basic block.

Lines marked with a plus ("+") indicate the start and possible continuation of compound basic blocks over one source line. This occurs, for example, in expressions such as "if ((A>0)&&(B>0)){ }", since the two clauses of the conjunction will be compiled as two basic blocks. The number displayed in the margin will the sum of the cycle counts for all the basic blocks associated with that line. Optionally, the individual counts from the individual basic blocks for the line can be shown on comment lines inserted after the initial compound basic block line. Also, lines marked with a pound sign ("#") indicate the start and continuation of a basic block or line that was not executed.

Figure 1:
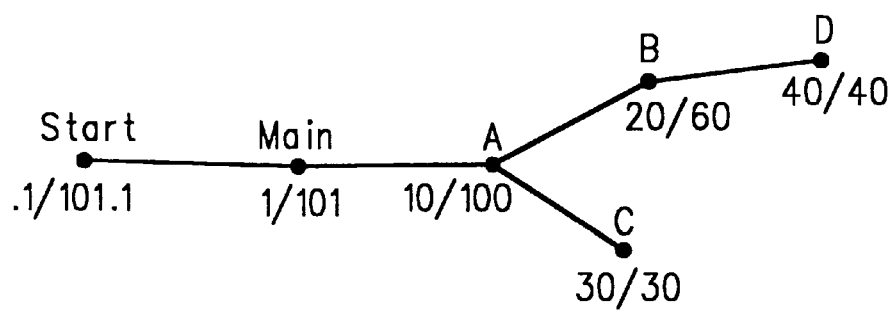
FIG. 1 illustrates a call graph with profiling information for a simple program.
Figure 10:
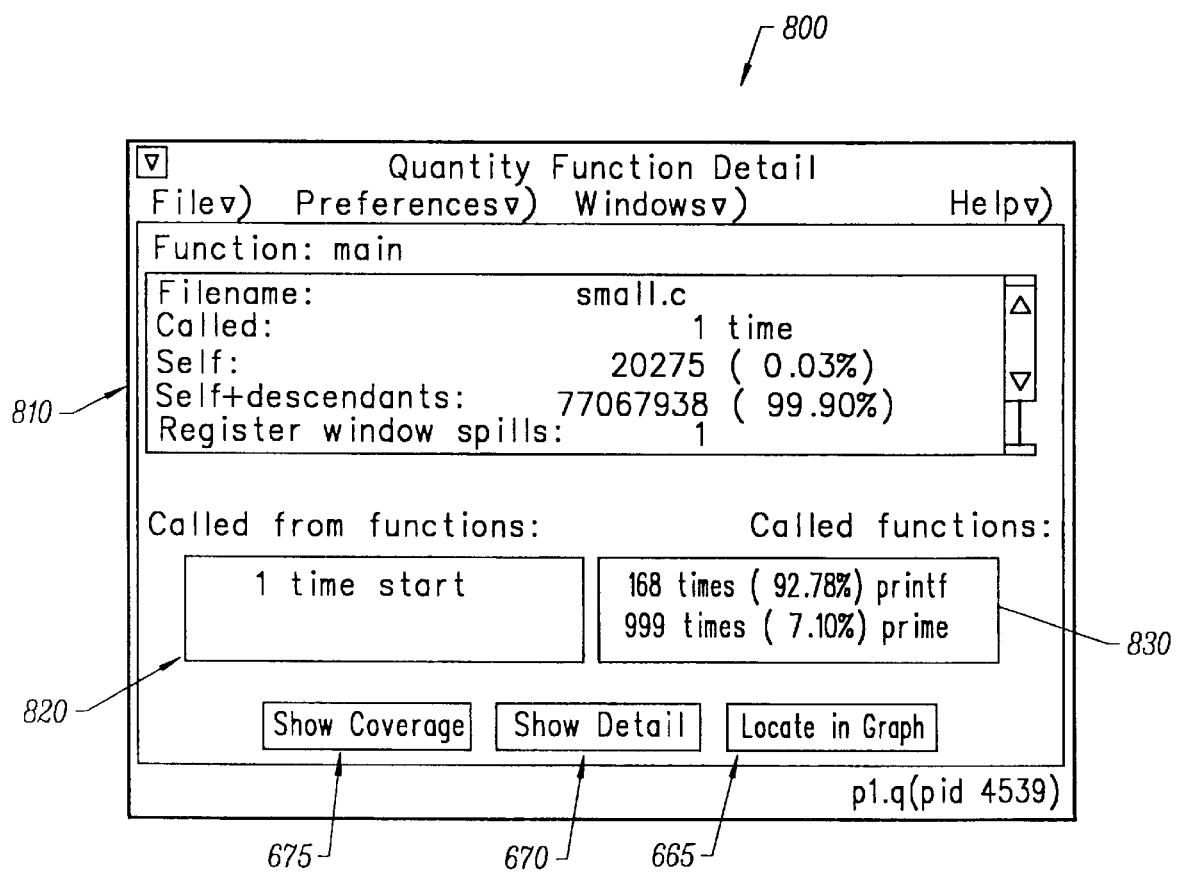
FIG. 10 shows a function detail display window of a particular embodiment of the present invention.
Figure 11A:
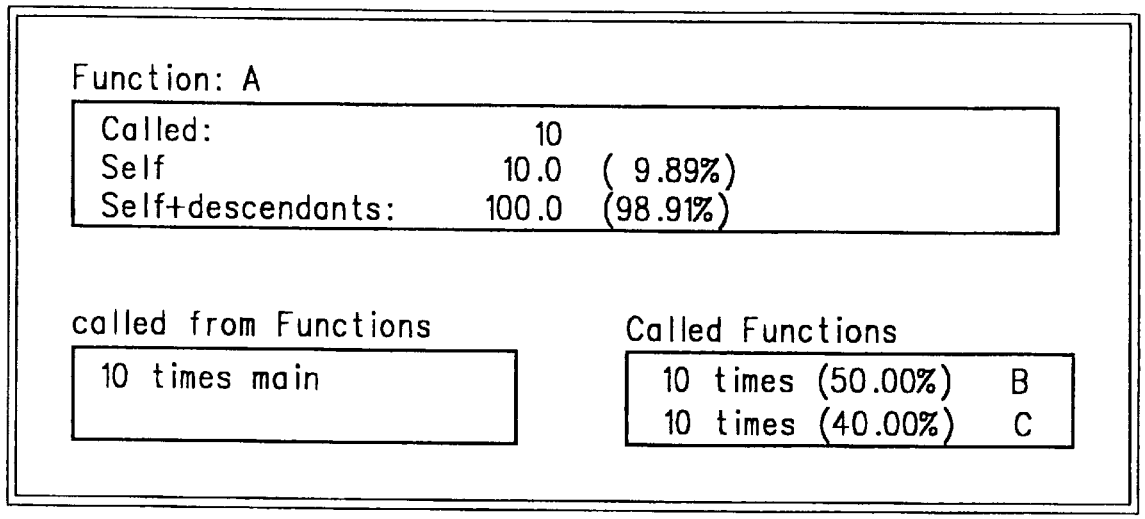
FIGS. 11A–D illustrate function detail windows for functions A, B, C, and D (of the program described with reference to FIG. 1B and Table II), respectively.
Figure 11B:
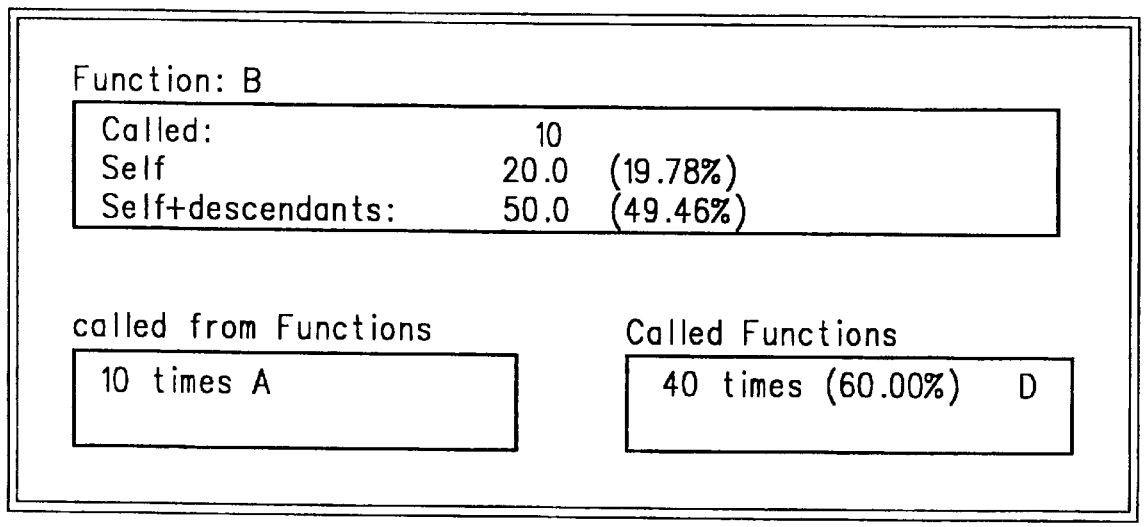
Figure 11C:
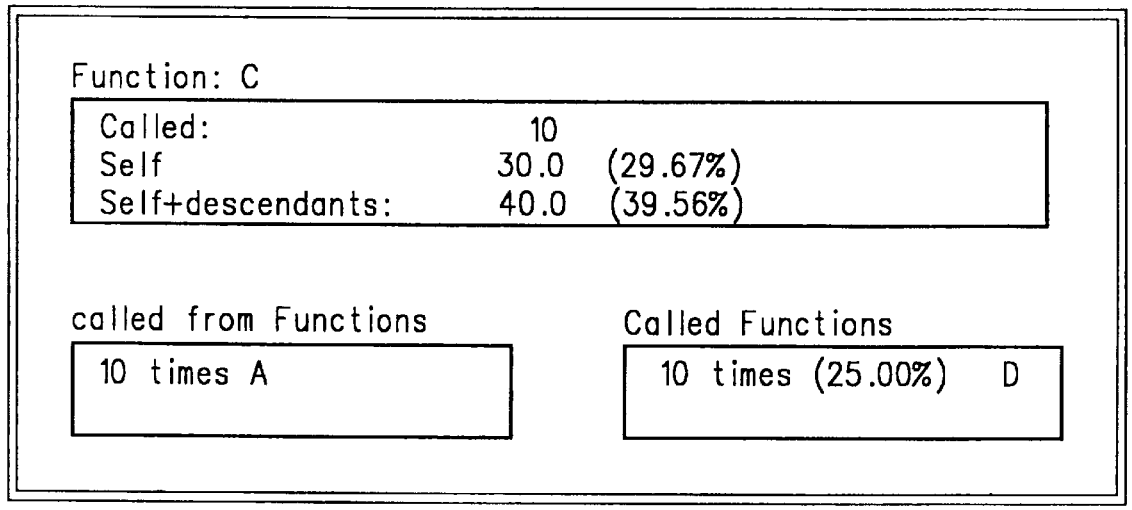
Figure 11D:
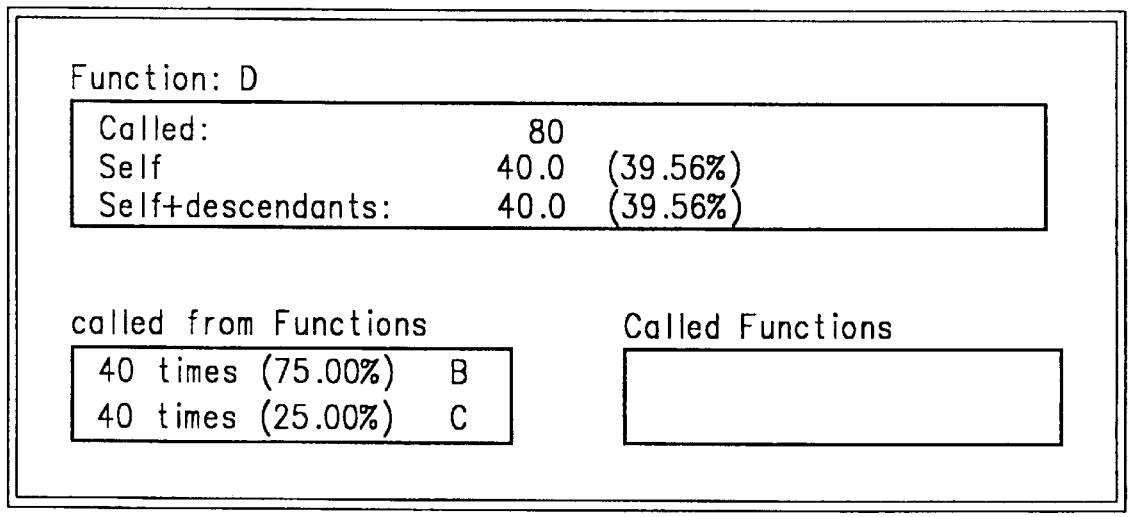

The function detail window 800 is illustrated in FIG. 10. In a function data text box 810, detailed data for this function is displayed, including the source code filename, the total number of times called, the self time (both in clock cycles and as a percentage of total program time), the self+descendants time, and the number of register spills caused by the calling to or return from the current function. Function detail window 800 also includes two other text boxes: called-from-functions box 820 and called-functions box 830, which list all the functions that called the current function, or that were called from the current function, respectively. These listings also include the number of times that the current function was called by/called the relevant function. If either of these boxes lists more than one function, then the listing will also include the current function's self+descendants time allocated to these functions according to what they were responsible for (as determined by the second order timing statistics collected as described above). This allocation is shown as a percentage of the current function's self+descendants time. As shown in function data box 810, the self time for the current function, main, was 0.03%, and the self+descendants time was 99.90%. Two functions were called by main, printf and prime. As shown in called-functions box 830, printf was called 169 times and these calls consumed 92.78% of the total program time. Prime was called 999 times, and these calls consumed 7.10% of the total program time. To illustrate this further, function detail windows for functions A, B, C, and D (of the program described with reference to FIG. 1B and Table II) are illustrated in FIGS. 11A–D, respectively. Listed function names can be selected, and actions performed, as described above with reference to the reports window.

Figure 12A:
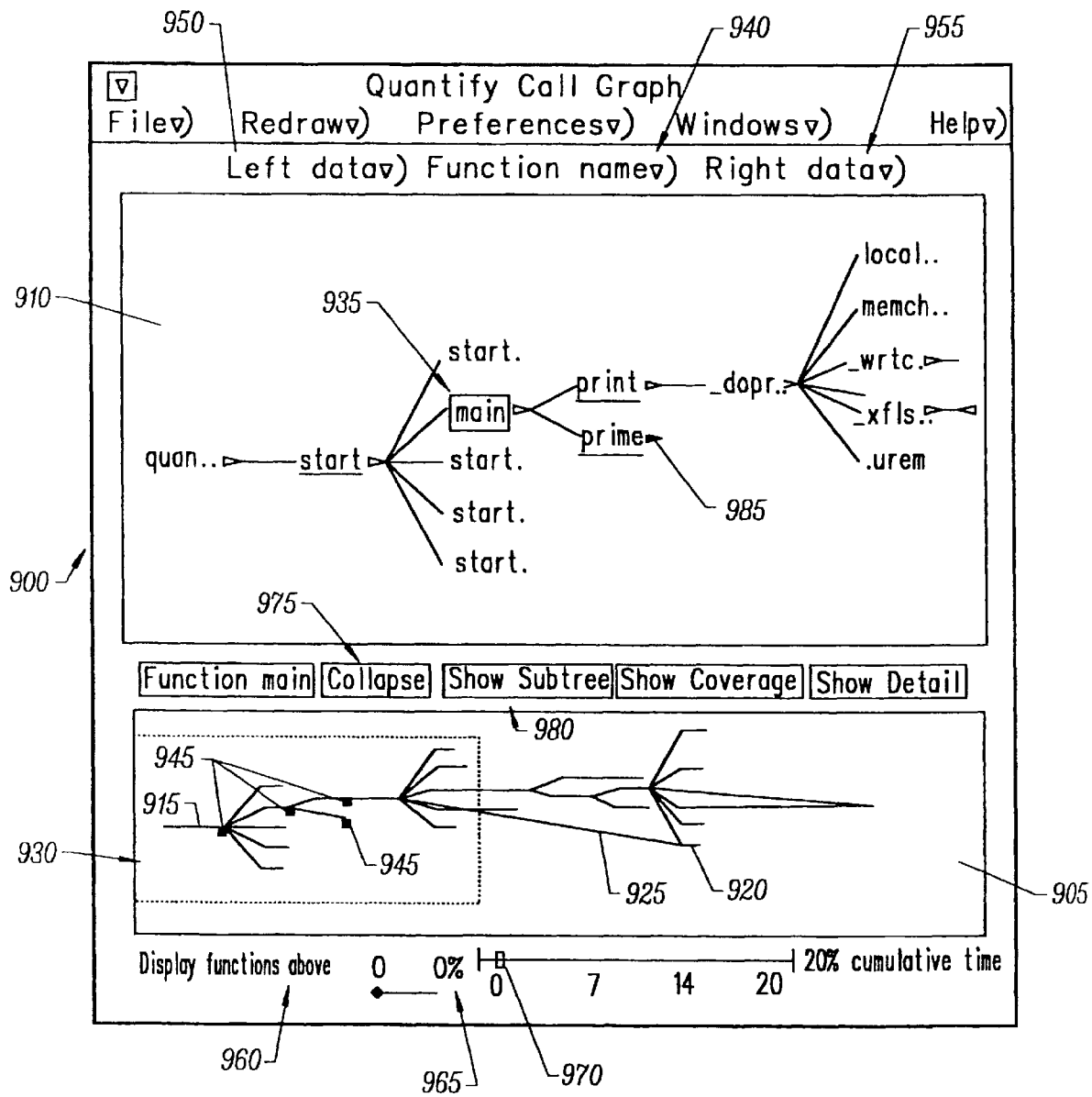
FIGS. 12A–C show call graph windows of a particular embodiment of the present invention.

When the user requests a call graph, a call graph window 900 is displayed, as illustrated in FIG. 12A. Call graph window 900 comprises two display panes: overview display pane 905 and detail display pane 910. As described further below, several mechanisms are provided to the user to control the extent to which all functions in the call graph are displayed. Overview display pane 905 displays a skeleton graph 915 showing the simple nodes 920 and arcs 925 for all functions currently selected for display. A detail box 930 can be moved around overview display pane 905 by the user to select the desired portion of the call graph for display in detail display pane 910.

Detail display pane 910 shows the selected portion of the call graph with each node identified by function name. The user can click on a function name to select it, as shown with the function "main" identified by reference numeral 935. A function name button 940 is provided to allow the user to select a maximum character length for display of function names within detail display pane 910. When a function is selected, the complete name of the selected function is displayed beneath detail display pane 910, and the selected function together with its displayed parents and children are spotlighted in overview pane 905, as indicated by reference numeral 945.

The displayed function names in detail display pane 910 can be augmented with various data. These are selected by left data button 950 and right data button 955, which display the desired data to the left and right of the displayed function name, respectively. Again, any of the collected data may be annotated to the function name.

B. Call Graph Pruning

Figure 12B:
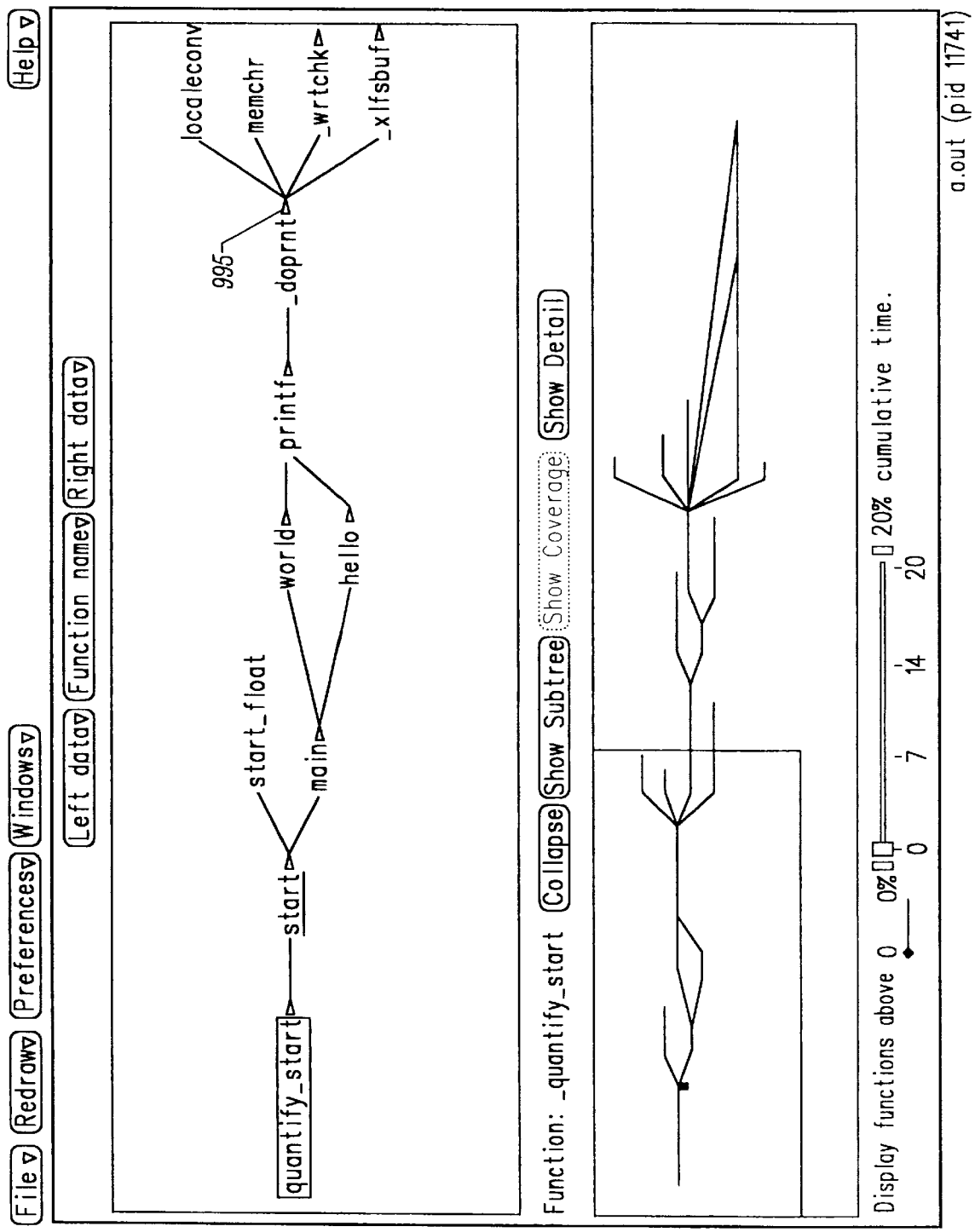
Figure 12C:
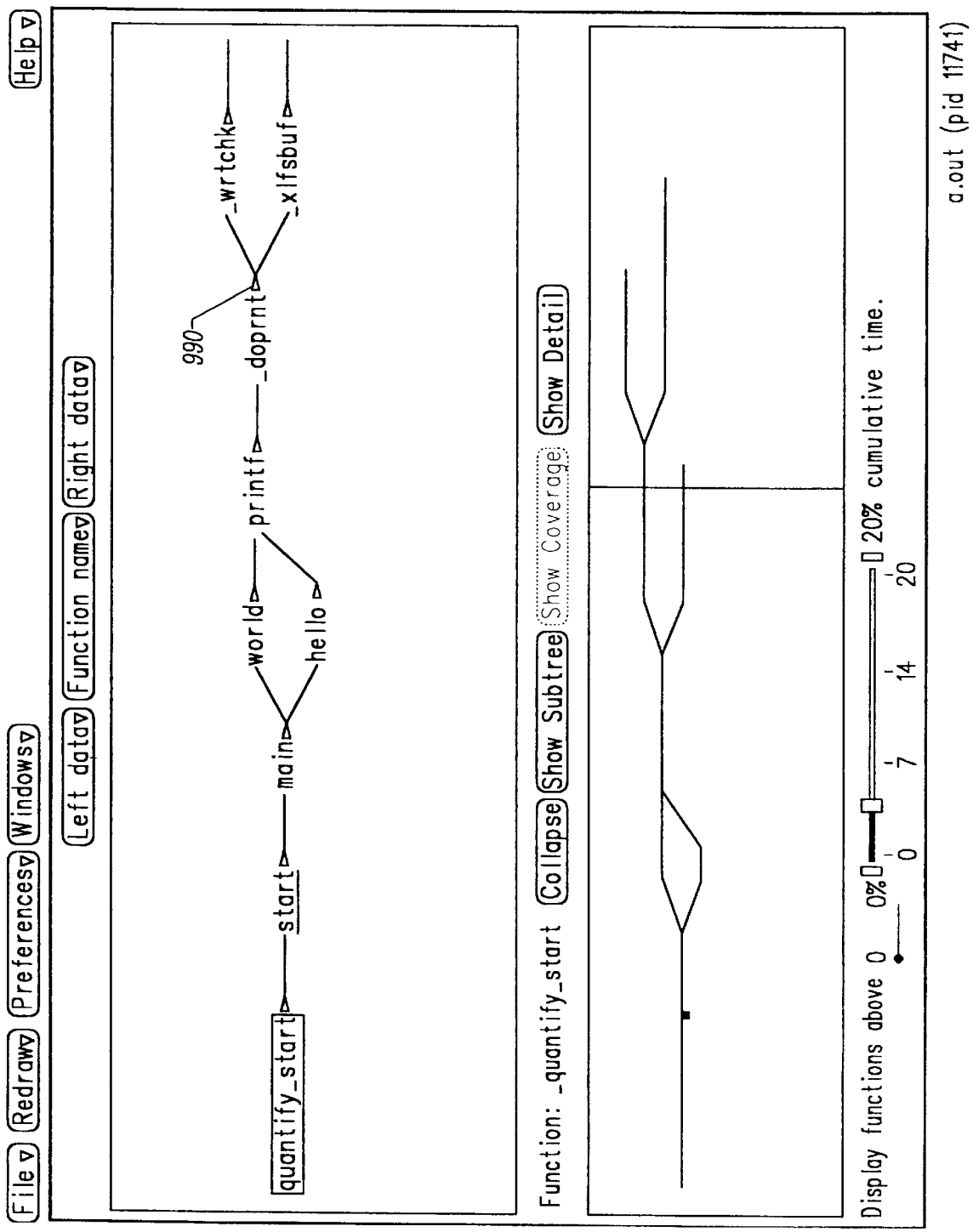

Several features are provided to control the amount of detail displayed for the call graph, i.e., which functions are displayed. A primary mechanism is a time filter or pruner 960, which establishes a minimum percentage time as a criterion for displaying functions. In the preferred embodiment, functions are filtered according to self+ descendants time, and the filter value can be entered through the keyboard at text box 965 or through control of a sliding scale 970 beneath overview display pane 905. Functions that do not meet the time filter criterion can be collapsed into their parent node functions. In the preferred embodiment the allowable ranges for the time filter are 0% to 20%, in 1% increments, although 0.1% increments or smaller could be used. A maximum value of 20% is employed in the preferred embodiment because with at this value the call graph will contain a maximum of 5 terminal nodes, even with an equal distribution of function times. Because function times strongly tend to have a varied distribution, a filter level of 20% is nearly always sufficient to adequately simplify the displayed call graph. The biggest jump in the number of displayed functions generally occurs in the vicinity of 0% and 1%. In some embodiments therefore, finer increments of the filter value are allowed between 0% and 2%, or at least between 0% and 1%. FIGS. 12B and 12C illustrate the operation of the time filter. In FIG. 12B, the time filter has been set to 0%, meaning that all functions of the program are selected for display. FIG. 12C shows the call graph for the same program, after the time filter has been set to a value of 3%; fewer functions are displayed.

Figure 13:
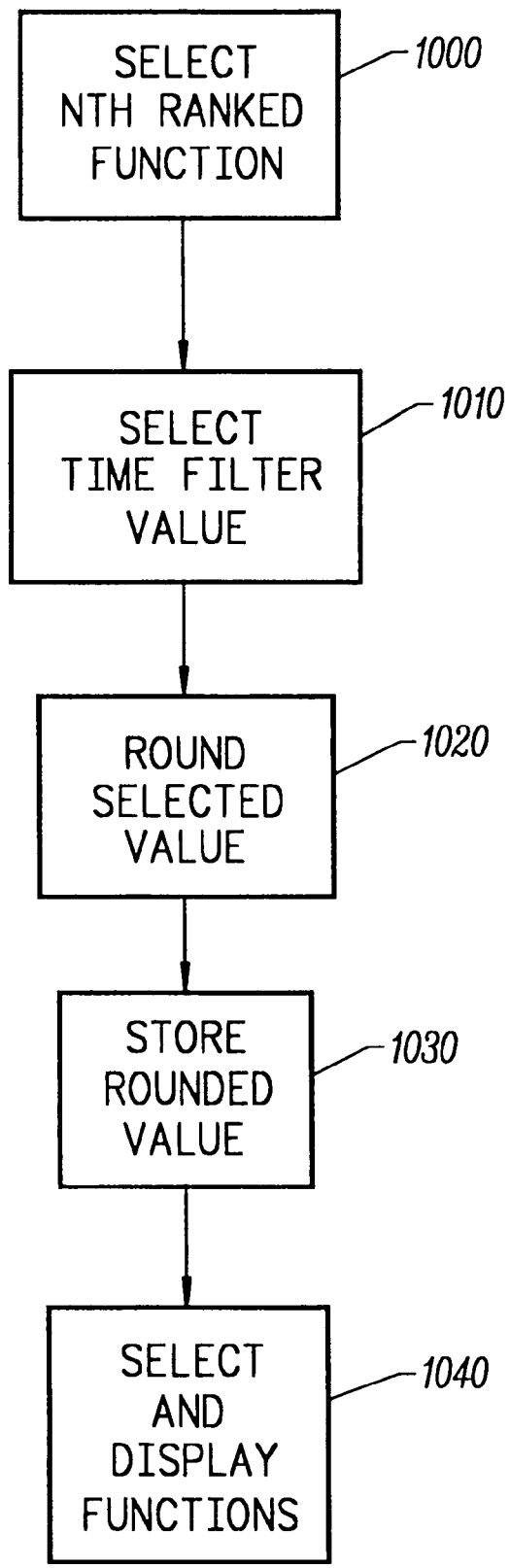
FIG. 13 shows a flow chart illustrating the process of automatically time filtering functions for display according to an aspect of the present invention.

In preferred embodiments, when call graph window 900 is first opened, the entire call graph is filtered according to time filter 960. Furthermore, the initial value for time filter 960 is automatically selected so that a predetermined number of functions will appear in the call graph. In one preferred embodiment, this predetermined number is thirty: this has been found to provide a good balance between providing sufficient information to the user versus overwhelming the user with an excessively detailed call graph. A flowchart illustrating the procedure for setting the time filter to display a number n of functions is shown in FIG. 13. At step 1000 the nth ranked function is identified. In the preferred embodiment this is achieved by sorting the functions according to self+descendants time. Either rounding of the stored self+descendants time, or coincidence, can result in a plurality of functions having the same self+descendants time and being equally ranked across the nth rank. Next, at step 1010 the self+descendants time of the determined function is selected as a time filter value. Following this, at step 1020 the selected percentage time value is rounded up to the next allowable increment for the time filter value, after which the rounded value is stored in a time filter value register at step 1030. In alternative embodiments the selected percentage time may remain unrounded or be rounded down. Finally, at step 1040, the functions having a self+descendants time at least equal to the time filter value are selected and displayed.

Referring again to FIG. 12A, once the initial call graph is displayed, the user can have more or less detail displayed by use of collapse button 975 and show subtree button 980. In the preferred embodiment, each graph node can have three different states of display detail, each indicated by distinct symbols. Collapse button 975 and show subtree button 980 cause a given node to step between these detail levels. The first state is that all child functions of a given node are collapsed into the given node and are not displayed; this is indicated by a filled arrowhead, such as indicated by reference numeral 985 in FIG. 12A. If the node is a terminal node, i.e., has no child functions, the detail symbol is omitted; the function name is displayed by itself. The second detail level is that only child functions meeting the time filter criterion are displayed; this detail level is indicated by a partially filled arrowhead, such as indicated by reference numeral 990 in FIG. 12C. The third detail level is that all child functions are displayed; this is indicated by an open arrowhead, such as indicated by reference numeral 995 in FIG. 12B. Activating collapse button 975 causes the selected function to be stepped down one level of detail; show subtree button 980 causes the selected function to be stepped up one level of detail. If the function has no children meeting the time filter, a partially filled arrowhead is shown with no children; if the time filter level is changed, qualifying children will be shown.

C. Representation of Call Graph Arcs

Additional features of the preferred embodiment are directed to presenting information on a call graph in a manner most readily and thoroughly understood by human users. According to this aspect of the invention, the time for a function (either the self time or the self+descendants time can be used; preferably the self+descendants time) is graphically indicated on the call graph by the thickness of the arc connecting the given function to its parent. This can be analogized to presenting the self+descendants times as a "river of time" in which the main flow gets divided into smaller and smaller streams.

A method of converting profiling information into a call graph according to this facet of the invention comprises, for each arc in the graph connecting a calling-function/parent-node to a called-function/child node, the steps of converting the self+descendants time for the called function into a width measure, and displaying the call graph with each arc having a display width corresponding to the width measure determined for that arc. A directly proportional relationship between self+descendants time and the arc width is not the most desirable, however. The drastic differences in scale from the primary arcs to the terminal arcs lessens the effectiveness and aesthetic value of such a representation, in comparison to other representations. In preferred representations, the relative thicknesses or widths of different arcs will vary according to the times they represent, but with the width ratio for two arcs representing different time values being less than the time ratio for the two arcs. This criterion can also be phrased as: the width over time ratio decreases with increasing time. Another paraphrasing of this guideline is that the width versus time curve has a positive first derivative and a negative second derivative.

In some preferred embodiments, the display width of an arc is computed to be logarithmically proportional to the self+descendants time for the called function. A generalized equation for such a logarithmic relationship is width=alog(time+b)+c, where the self+descendants percentage time is represented as a real number ranging from 0.0 to 1.0. The variable c can be viewed as providing an offset that determines the thickness of an arc for a minimum time value. If an arc representing marginally above zero time is to be displayed as one pixel thick, then c would be chosen as 1-alog(b). Other common logical operations can be used to establish minimum and maximum values instead of using the above constants.

Figure 14A:
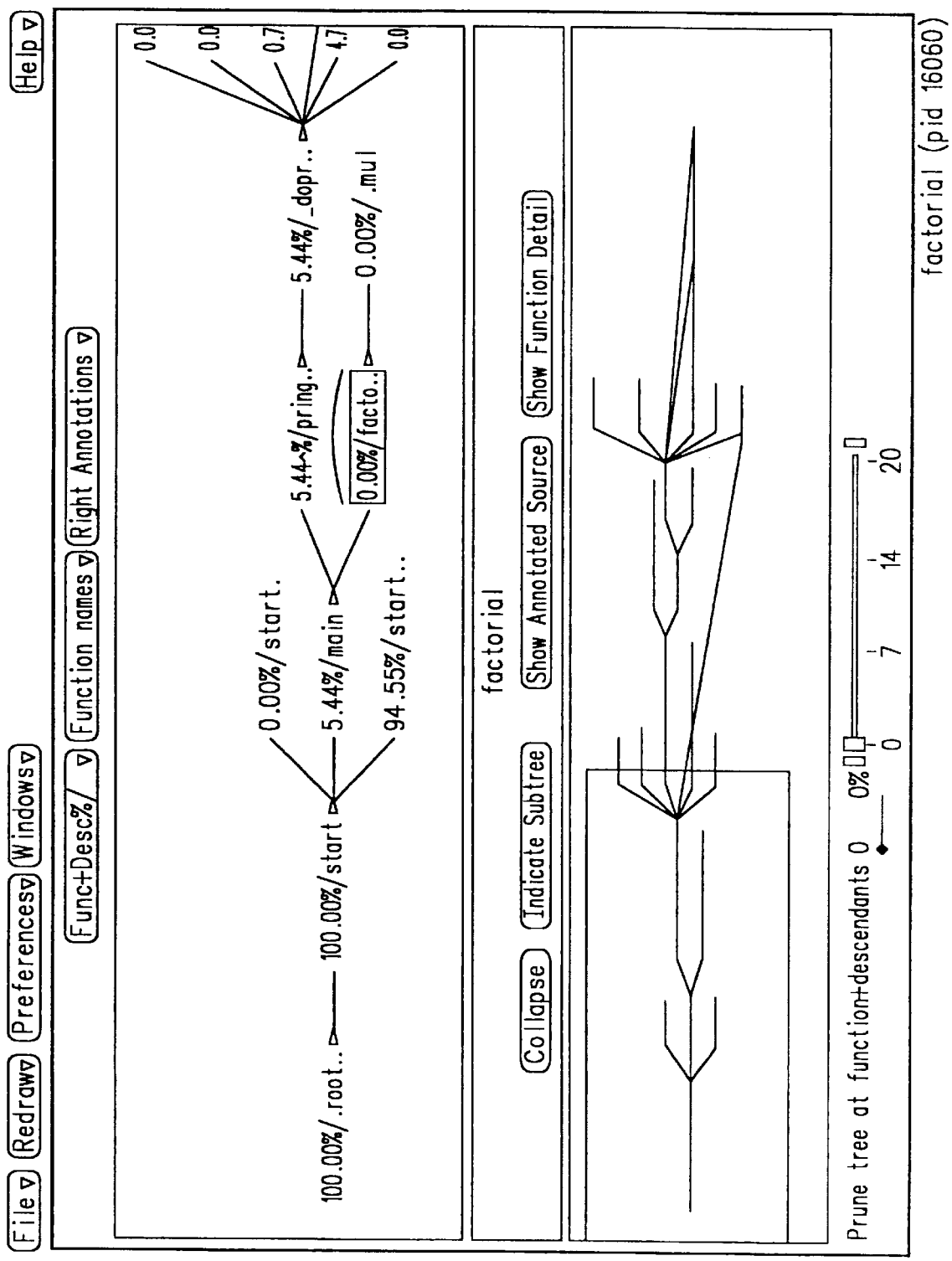
FIGS. 14A–C show examples of a call graph displayed according to this aspect of the preferred embodiment of the invention.
Figure 14B:
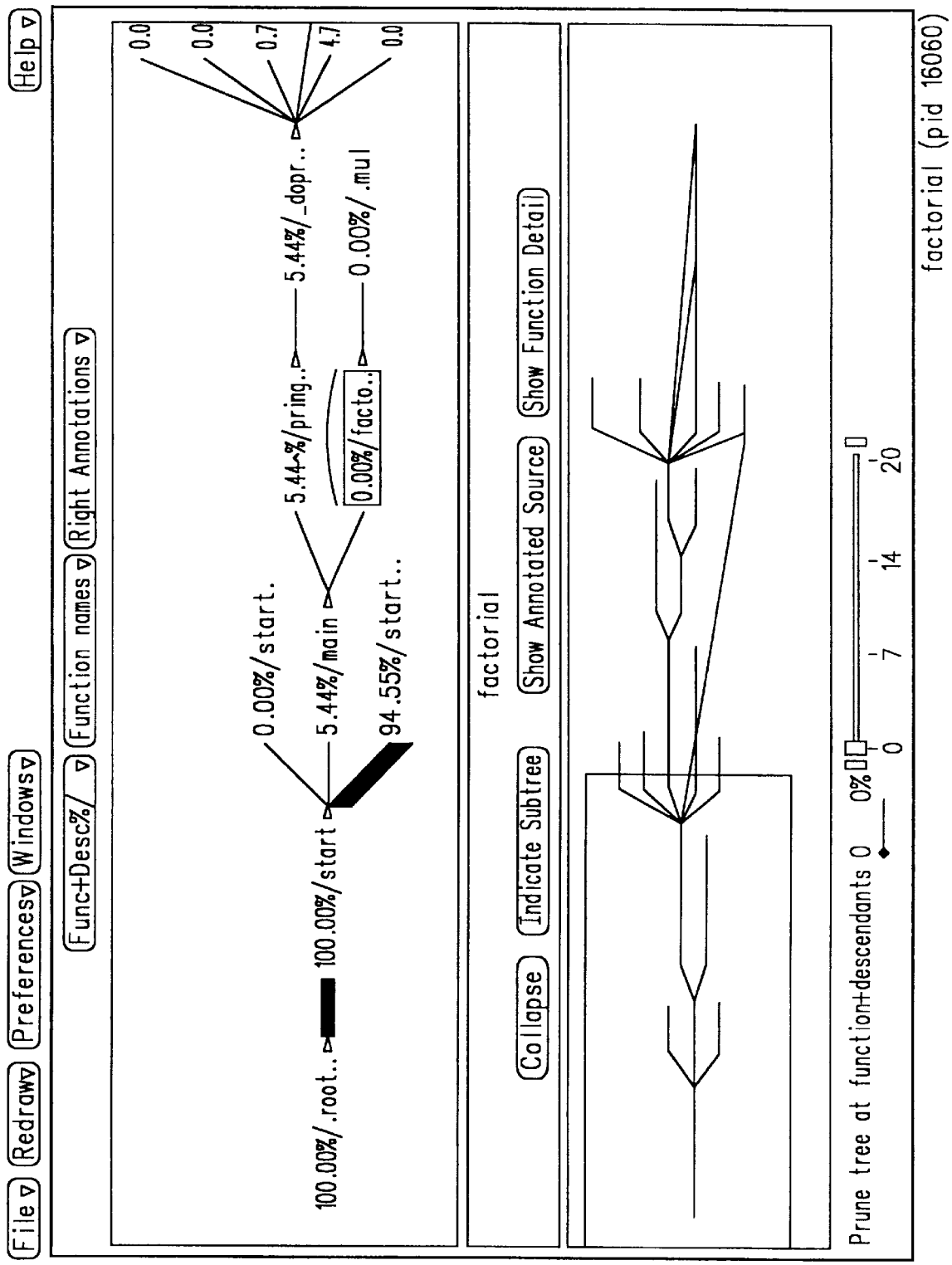
Figure 14C:
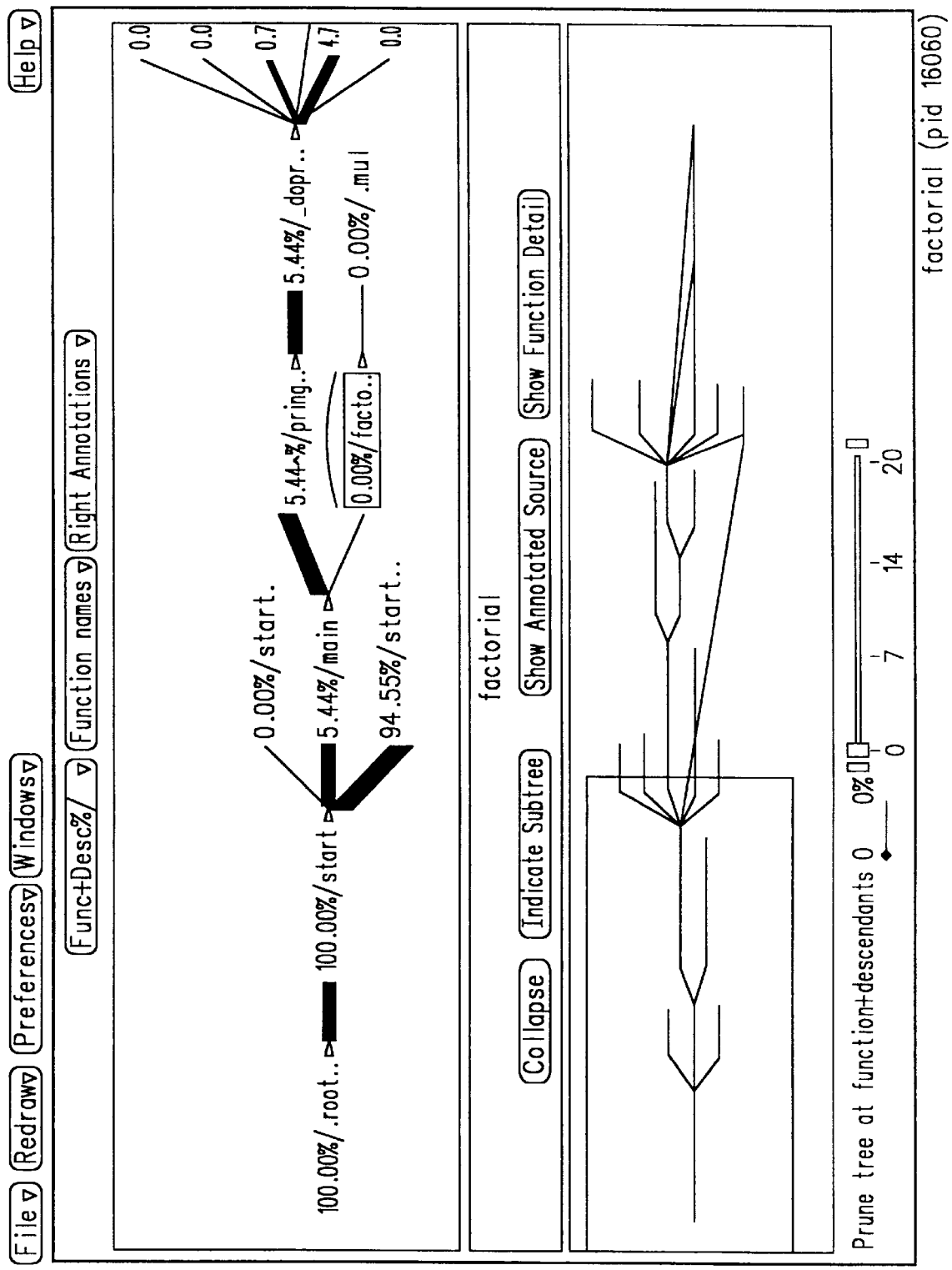

In the most preferred embodiment, the user is allowed to select between three display options: no weighting for arcs, linear weighting, and logarithmic weighting. Examples of a call graph displayed according to this aspect of the preferred embodiment of the invention are shown in FIGS. 14A–C. FIG. 14A shows a call graph with no weighting; all arcs are drawn with the same thickness. Also note the curved bar shown over the selected function, factorial. This curved bar indicates that the function is recursive. FIG. 14B shows a call graph with linear weighting; the arc self+descendants time is rounded up to the nearest 10%, and then divided by 10%, to yield a linear range of 1 to 10 pixels for arcs. FIG. 14C shows a call graph with logarithmic weighting. The particular equation used for the display of FIG. 14C is $$W=MIN(9, MAX(1, LOG_2(1000*T+0.0001))).$$

In other embodiments, the arc width has an inverse exponential relationship to time and is determined according to the general equation $w=a*b^{-t}+c$, where higher values of b will produce graphs better suited for distinguishing arcs having small time values. For smaller values of b the relationship between width and time will become nearly linear. One embodiment employs the equation $w=12-11e^{-t}$, where e is the transcendental number. If w is taken as the number of pixels for the arc, this equation provides a range of 1 to 8 pixels for representing arcs. In other embodiments, a lookup table is provided to relate arc times to arc widths. The lookup table need not implement a particular mathematical relationship, but can tailored directly to a user's preferences: arcs falling in a first time range would have a width of 1, arcs in a second time range would have a width of 2, etc. This allows the user to tailor the display to best distinguish arcs in various time ranges of most concern to the user. In some embodiments the conversion of times into arc widths is achieved by performing the selected mathematical equation for each arc as the call graph is constructed, and storing the determined thickness for each arc at that time.

In yet other embodiments, the selected mathematical equation is performed each time an arc is displayed. A subset of these last embodiments tailor the equation used according to the minimum arc time of the currently displayed graph. Using the constrains that the minimum currently displayed arc time will have a width of 1, and that an arc time of 1.0 will have a globally predetermined width MAX, parameters for the desired equation are determined by the computer, and the arcs are displayed accordingly. This adaptive tailoring of arc width assures that the full range of the selected time versus width relationship will be employed for the currently displayed arcs, providing the clearest presentation to the user. Of course, the adaptive tailoring can be achieved by using a plurality of lookup tables rather than active recalculation of parameters.

Another feature of the preferred embodiment is the ability to select a given function to be treated as "root" for the purpose of calculating arc widths. In this embodiment arc widths are determined by function times normalized against the function time of the selected "virtual root" rather than by function times normalized against the total execution time of the program.

Alternative Embodiments

It is to be understood that the above description is intended to be illustrative and not restrictive. Many other embodiments will be apparent to those of skill in the art upon reviewing the above description. For instance, rather than being added through object code processing, the instructions used to implement monitoring could be added in a compiler based or precompiler based manner, both of which have some advantages and significant disadvantages, however.

To maximize accuracy at the expense of profiling overhead, further simulation can be done, especially to handle conflicts between different instructions. For example, in many systems the execution of an instruction requiring a floating point calculation will be performed by a coprocessor in parallel with the execution by the main processor of the instructions following the floating point calculation instruction. If one of these later instructions requires the use of the result of the floating point calculation before the coprocessor has completed the calculation, execution will hangup and stall until the coprocessor is finished. This can be profiled by determining when such stalls might occur, determining the number of cycles from the floating point instruction to the potential stall, and using timing code to determine the length of time used by the coprocessor. The time used for profiling data would then be the longer of the determined number of cycles versus the time for the coprocessor.

Similar techniques can be used in a multiprocessor or multi-threaded environment involving various synchronization mechanisms among the multiple processes. The profiling code would individually track the time required by each synchronized process between synchronization points; at the synchronization point the longest determined time would then be charged against all of the synchronized processes.

Additionally, essentially all of the timing discussed above could be performed by wrapping the profiled code in start-time and end-time code to use the time-of-day function or similar timers to determine execution times. (Call instructions would need to be individually wrapped in timing code, or employ the "bubbling up" of descendants' times as in the preferred embodiment in order to properly track self time versus self+descendants time.) Total reliance on wrapping blocks in timing code has drawbacks, however. These relate to overhead and resolution. The overhead for timing wraps is fairly high; on current systems it is generally about thirty to forty cycles. Accumulating tallies of cycles for fixed length instructions, on the other hand, generally only requires one to two cycles. Resolution is a significant problem as well. The finest resolution timing clocks generally available today have a resolution of about 34 microseconds, which for a typical processor corresponds to about 1000 cycles. This must be considered in light of the average length of a basic block (6 cycles).

The scope of the invention should, therefore, be determined with reference to the appended claims, along with the full scope of equivalents to which such claims are entitled.

What is claimed is:

1. A method for profiling execution of a computer program including functions, comprising:

collecting profiling data for the functions during execution of the computer program, the profiling data including self+descendants times for the functions;

constructing a call graph of function calls for the computer program;

pruning the call graph to remove arcs depicting a function call to a function that has a self+descendants time that is less than a pruning time filter value; and displaying a representation of the call graph including arcs that connect functions to depict function calls and graphical representations that graphically show the relative self+descendants times for the functions.

2. The method of claim 1, wherein the pruning time filter value is automatically determined under computer control so that a predetermined number of functions of the computer program have self+descendants times equal to or greater than the pruning time filter value.

3. The method of claim 2, wherein the predetermined number of functions of the computer program is less than one hundred.

4. The method of claim 3, wherein the predetermined number of functions of the computer program is thirty.

5. The method of claim 1, wherein the graphical representations of the self+descendants times for the functions are the widths of the arcs such that the widths are proportional to the self+descendants times for the functions.

6. The method of claim 5, wherein the widths of the arcs are linearly or exponentially proportional to the self+descendants times for the functions.

7. The method of claim 1, wherein collecting profiling data includes determining a time for an operating system call by recording a start time before the operating system call and recording an end time after the operating system call such that the time for the operating system call is the difference between the start and stop times.

8. The method of claim 1, further comprising augmenting the computer program to add profiling code.

9. A computer program product for profiling execution of a computer program including functions, comprising:

computer code that collects profiling data for the functions during execution of the computer program, the profiling data including self+descendants times for the functions;

computer code that constructs a call graph of function calls for the computer program;

computer code that prunes the call graph to remove arcs depicting a function call to a function that has a self+descendants time that is less than a pruning time filter value;

computer code that displays a representation of the call graph including arcs that connect functions to depict function calls and graphical representations that graphically show the relative self+descendants times for the functions; and a computer readable medium that stores said computer codes.

10. A method for profiling execution of a computer program including functions, comprising:

collecting profiling data for the functions during execution of the computer program, the profiling data including self+descendants times for the functions;

constructing a call graph of function calls for the computer program; and displaying a representation of the call graph including arcs that connect functions to depict function calls and graphical representations that graphically show the relative self+descendants times for the functions, wherein the graphical representations of the self+descendants times for the functions are the widths of the arcs such that the widths are proportional to the self+descendants times for the functions.

11. The method of claim 10, wherein the widths of the arcs are linearly or exponentially proportional to the self+descendants times for the functions.

12. The method of claim 10, further comprising pruning the call graph to remove arcs depicting a function call to a function that has a self+descendants time that is less than a pruning time filter value.

13. The method of claim 12, wherein the pruning time filter value is automatically determined under computer control so that a predetermined number of functions of the computer program have self+descendants times equal to or greater than the pruning time filter value.

14. The method of claim 13, wherein the predetermined number of functions of the computer program is less than one hundred.

15. The method of claim 14, wherein the predetermined number of functions of the computer program is thirty.

16. The method of claim 10, wherein collecting profiling data includes determining a time for an operating system call by recording a start time before the operating system call and recording an end time after the operating system call such that the time for the operating system call is the difference between the start and stop times.

17. The method of claim 10, further comprising augmenting the computer program to add profiling code.

18. A computer program product for profiling execution of a computer program including functions, comprising:

computer code that collects profiling data for the functions during execution of the computer program, the profiling data including self+descendants times for the functions;

computer code that constructs a call graph of function calls for the computer program;

computer code that displays a representation of the call graph including arcs that connect functions to depict function calls and graphical representations that graphically show the relative self+descendants times for the functions, wherein the graphical representations of the self+descendants times for the functions are the widths of the arcs such that the widths are proportional to the self+descendants times for the functions; and a computer readable medium that stores said computer codes.

19. A method for profiling execution of a computer program including functions, comprising:

collecting profiling data for the functions during execution of the computer program, the profiling data including self+descendants times for the functions;

constructing a call graph of function calls for the computer program;

pruning the call graph to remove arcs depicting a function call to a function that has a self+descendants time that is less than a pruning time filter value, wherein the pruning time filter value is automatically determined under computer control so that a predetermined number of functions of the computer program have self+descendants times equal to or greater than the pruning time filter value; and displaying a representation of the call graph including arcs that connect functions to depict function calls and graphical representations that graphically show the relative self+descendants times for the functions.

20. The method of claim 19, wherein the graphical representations of the self+descendants times for the functions are the widths of the arcs such that the widths are proportional to the self+descendants times for the functions.

21. The method of claim 20, wherein the widths of the arcs are linearly or exponentially proportional to the self+descendants times for the functions.

22. The method of claim 19, wherein the predetermined number of functions of the computer program is less than one hundred.

23. The method of claim 22, wherein the predetermined number of functions of the computer program is thirty.

24. The method of claim 19, wherein collecting profiling data includes determining a time for an operating system call by recording a start time before the operating system call and recording an end time after the operating system call such that the time for the operating system call is the difference between the start and stop times.

25. The method of claim 19, further comprising augmenting the computer program to add profiling code.

26. A computer program product for profiling execution of a computer program including functions, comprising:
    computer code that collects profiling data for the functions during execution of the computer program, the profiling data including self+descendants times for the functions;
    computer code that constructs a call graph of function calls for the computer program;
    computer code that prunes the call graph to remove arcs depicting a function call to a function that has a self+descendants time that is less than a pruning time filter value, wherein the pruning time filter value is automatically determined under computer control so that a predetermined number of functions of the computer program have self+descendants times equal to or greater than the pruning time filter value;
    computer code that displays a representation of the call graph including arcs that connect functions to depict function calls and graphical representations that graphically show the relative self+descendants times for the functions; and
    a computer readable medium that stores said computer codes.

27. A method for profiling execution of a computer program including functions, comprising:
    collecting profiling data for the functions during execution of the computer program, the profiling data including times for the functions;
    constructing a call graph of function calls for the computer program; and
    displaying a representation of the call graph including arcs that connect functions to depict function calls and graphical representations that graphically show the relative times for the functions.

28. The method of claim 27, wherein the graphical representations of the times for the functions are the widths of the arcs such that the widths are proportional to the times for the functions.

29. The method of claim 28, wherein the widths of the arcs are linearly or exponentially proportional to the times for the functions.

30. The method of claim 27, further comprising pruning the call graph to remove arcs depicting a function call to a function that has a time that is less than a pruning time filter value.

31. The method of claim 28, wherein the pruning time filter value is automatically determined under computer control so that a predetermined number of functions of the computer program have times equal to or greater than the pruning time filter value.

32. The method of claim 31, wherein the predetermined number of functions of the computer program is less than about one hundred.

33. The method of claim 32, wherein the predetermined number of functions of the computer program is about thirty.

34. The method of claim 27, wherein collecting profiling data includes determining a time for an operating system call by recording a start time before the operating system call and recording an end time after the operating system call such that the time for the operating system call is the difference between the start and stop times.

35. The method of claim 27, further comprising augmenting the computer program to add profiling code.

36. The method of claim 27, wherein the times are self or self+descendants times for the functions.

37. A computer program product for profiling execution of a computer program including functions, comprising:
    computer code that collects profiling data for the functions during execution of the computer program, the profiling data including times for the functions;
    computer code that constructs a call graph of function calls for the computer program;
    computer code that displays a representation of the call graph including arcs that connect functions to depict function calls and graphical representations that graphically approximate the relative times for the functions; and
    a computer readable medium that stores said computer codes.

* * * * *